(12) United States Patent
Oyama

(10) Patent No.: US 10,578,992 B2
(45) Date of Patent: Mar. 3, 2020

(54) IMAGE FORMING APPARATUS AND IMAGE FORMING METHOD

(71) Applicant: CANON KABUSHIKI KAISHA, Tokyo (JP)

(72) Inventor: Naoki Oyama, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 15/842,490

(22) Filed: Dec. 14, 2017

(65) Prior Publication Data
US 2018/0178549 A1 Jun. 28, 2018

(30) Foreign Application Priority Data
Dec. 27, 2016 (JP) ................................. 2016-252973

(51) Int. Cl.
| | | |
|---|---|---|
| B41J 2/44 | (2006.01) | |
| B41J 2/47 | (2006.01) | |
| G02B 26/12 | (2006.01) | |
| G03G 15/04 | (2006.01) | |
| H04N 1/405 | (2006.01) | |
| H04N 1/113 | (2006.01) | |
| G03G 15/041 | (2006.01) | |
| H04N 1/50 | (2006.01) | |

(52) U.S. Cl.
CPC ............ *G03G 15/041* (2013.01); *B41J 2/442* (2013.01); *B41J 2/471* (2013.01); *G02B 26/122* (2013.01); *G02B 26/125* (2013.01); *G03G 15/0409* (2013.01); *G03G 15/04018* (2013.01); *H04N 1/113* (2013.01); *H04N 1/506* (2013.01); *H04N 1/405* (2013.01)

(58) Field of Classification Search
CPC ......... B41J 2/442; B41J 2/471; G02B 26/125; G03G 15/0409; G03G 15/041; H04N 1/405; H04N 1/113
See application file for complete search history.

(56) References Cited

U.S. PATENT DOCUMENTS

| | | | |
|---|---|---|---|
| 9,360,791 B2 | 6/2016 | Oyama | ................ G03G 15/043 |
| 2015/0365554 A1* | 12/2015 | Kawana | ............ H04N 1/02885 |
| | | | 358/474 |
| 2017/0359486 A1 | 12/2017 | Oyama | ................ G04N 1/4056 |

FOREIGN PATENT DOCUMENTS

JP         2007-199556         8/2007

* cited by examiner

*Primary Examiner* — Alessandro V Amari
*Assistant Examiner* — Kendrick X Liu
(74) *Attorney, Agent, or Firm* — Venable LLP

(57) ABSTRACT

An image forming apparatus, including: an image signal generating portion configured to generate an image signal based on image data; a light source configured to emit a light beam based on the image signal; and a deflection device configured to deflect the light beam in a main scanning direction, wherein the image signal generating portion includes: a mode setting portion configured to set a plurality of modes including a mode in which a value of a pixel of the image data is not converted and a mode in which the value of the pixel in one or more lines is converted, to a plurality of areas into which a scanning area is divided in the main scanning direction, respectively; and a pixel value conversion portion configured to convert the value of the pixel in each mode in accordance with a position of the pixel in the main scanning direction.

12 Claims, 14 Drawing Sheets

THREE LINES OF TRAILING EDGE PORTION

THREE LINES OF TRAILING EDGE PORTION

THREE LINES OF TRAILING EDGE PORTION

TOP SIGNAL

BD SIGNAL

VDO SIGNAL

VCLK

IMAGE FORMING APPARATUS AND IMAGE FORMING METHOD

BACKGROUND OF THE INVENTION

Field of the Invention

The present invention relates to an image forming apparatus in which a light beam emitted from a light source scans a surface of a photosensitive member, and to an image forming method.

Description of the Related Art

Hitherto, a digital copying machine, a laser beam printer, a facsimile apparatus, or other such electrophotographic image forming apparatus includes a light scanning apparatus configured to scan a surface of a photosensitive member with a light beam to form an electrostatic latent image. In the light scanning apparatus, the light beam is emitted from a light source based on image data. The light beam emitted from the light source is deflected by a rotary polygon mirror. The deflected light beam is transmitted through an imaging lens to be imaged on the surface of the photosensitive member as a light spot. The light spot imaged on the surface of the photosensitive member is moved on the surface of the photosensitive member in accordance with rotation of the rotary polygon mirror to form an electrostatic latent image on the surface of the photosensitive member. A related-art imaging lens has an fθ characteristic. The fθ characteristic represents an optical characteristic of imaging the light beam on the surface of the photosensitive member so that the light spot moves on the surface of the photosensitive member at a constant speed while the rotary polygon mirror is being rotated at a constant angular velocity. Appropriate exposure can be performed through use of an imaging lens having the fθ characteristic. However, the imaging lens having the fθ characteristic is relatively large in size and high in cost. Therefore, for the purpose of reduction in size or cost of an image forming apparatus, it is conceivable to avoid using the imaging lens having the fθ characteristic or to use a small-size low-cost imaging lens that does not have the fθ characteristic.

In an image forming apparatus using the imaging lens that does not have the fθ characteristic, the light spot imaged on the surface of the photosensitive member is changed in moving speed in a main scanning direction. The moving speed of the light spot at both end portions of a scanning area on the surface of the photosensitive member is higher than the moving speed at a center of the scanning area. For example, there is a case in which the moving speed at both end portions is higher than the moving speed at the center by 35% or more. As a result, a width of one pixel at both end portions of the scanning area on the surface of the photosensitive member is larger than a width of one pixel at the center. Further, a light intensity per unit length at both end portions of the scanning area is smaller than a light intensity per unit length at the center. For example, when the light intensity of the light beam is set with the light intensity per unit length at the center of the scanning area as a reference, the light intensity per unit length at both end portions of the scanning area is lower than an appropriate light intensity. When the light intensity changes, the image density changes, with the result that image failure occurs. Therefore, in Japanese Patent Application Laid-Open No. 2007-199556, there is disclosed a method of controlling an image density by dividing a scanning area into a plurality of areas in a main scanning direction and using different dither matrices for the divided areas.

However, when a plurality of line images are formed, a toner may scatter during a fixing process, with the result that a phenomenon which is called "toner scattering" causing scattering of the toner to a white base portion may occur. When an electrostatic latent image for the plurality of line images is formed by the light beam on the surface of the photosensitive member, a charge amount at that portion becomes larger. Such a large charge amount causes the toner to be liable to gather on the electrostatic latent image for the plurality of line images. Part of the toner gathered on that portion may scatter during the fixing process, or the toner expanded by heat may extend beyond an image area to a non-image area. There is a difficulty in preventing the toner scattering at the line images by the method disclosed in Japanese Patent Application Laid-Open No. 2007-199556.

SUMMARY OF THE INVENTION

Therefore, the present invention provides an image forming apparatus which suppresses toner scattering at line images.

According to one embodiment of the present invention, there is provided an image forming apparatus, comprising:
an image signal generating portion configured to generate an image signal based on image data to output the image signal in accordance with a video clock;
a light source configured to emit a light beam based on the image signal;
a deflection device configured to deflect the light beam so that the light beam emitted from the light source scans a surface of a photosensitive member in a main scanning direction; and
a lens configured to image the light beam deflected by the deflection device as a light spot onto the surface of the photosensitive member,
wherein the image signal generating portion comprises:
a mode setting portion configured to set a plurality of modes including a mode in which a value of a pixel of the image data is not converted and a mode in which one or more lines in which the value of the pixel of the image data is to be converted are set, to a plurality of areas into which a scanning area on which an image is to be formed is divided in the main scanning direction, respectively; and
a pixel value conversion portion configured to convert the value of the pixel of the image data in each of the plurality of modes in accordance with a position of the pixel in the main scanning direction of the image data.

Further features of the present invention will become apparent from the following description of exemplary embodiments with reference to the attached drawings.

BRIEF DESCRIPTION OF THE DRAWINGS

FIG. 11A, FIG. 11B, and FIG. 11C are illustrations of types of determination patterns.

DESCRIPTION OF THE EMBODIMENTS

Now, with reference to the accompanying drawings, a description will be provided of embodiments of the present invention. The configurations of the embodiments described below are only examples, and the present invention is not limited to the illustrated configurations.

<Image Forming Apparatus>

Figure 1:
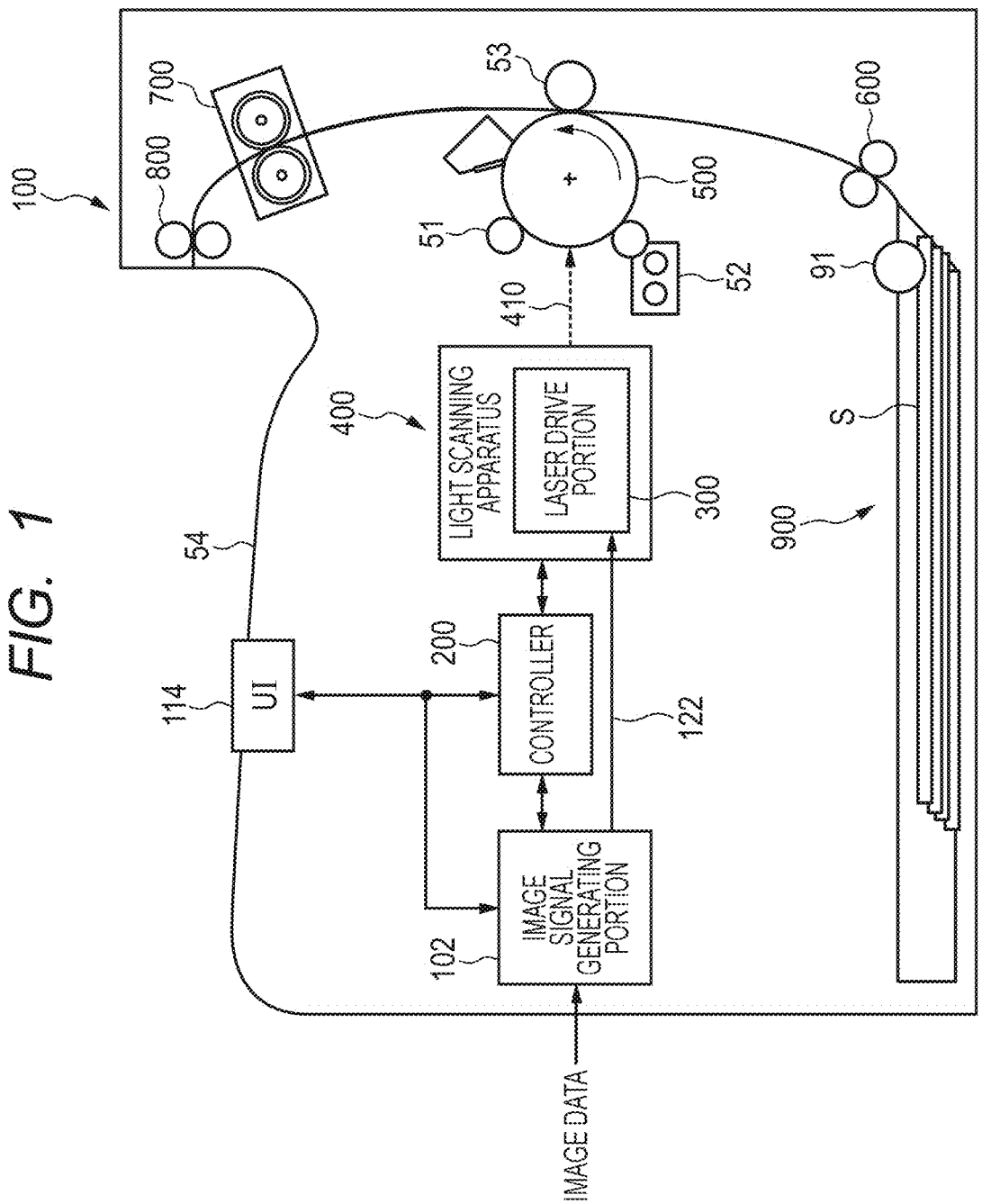
FIG. 1 is a schematic view of an image forming apparatus.

FIG. 1 is a schematic view of an image forming apparatus 100. In the embodiment, the image forming apparatus 100 and an image forming method will be described with an electrophotographic single-function printer as an example. The image forming apparatus 100 includes a light scanning apparatus 400 as a light scanning unit configured to scan, with a laser beam (hereinafter referred to as "light beam") 410, a surface of a photosensitive drum 500 serving as a photosensitive member. In a laser scanning optical system of the image forming apparatus 100, an imaging lens having an fθ characteristic (fθ lens) is not used, and hence a light spot of the light beam imaged on the surface of the photosensitive member is not constant in scanning speed (moving speed) in a main scanning direction. The light scanning apparatus 400 includes a laser drive portion 300. The laser drive portion 300 is configured to emit the light beam 410 based on a video signal (hereinafter referred to as "VDO signal") 122 serving as an image signal output from a controller 200. The light beam 410 scans the surface of the photosensitive drum 500, which is uniformly charged by a charger 51 serving as a charging unit, to form an electrostatic latent image (hereinafter referred to as "latent image") on the surface of the photosensitive drum 500. A developing device 52 serving as a developing unit is configured to cause a toner serving as a developer to adhere to the latent image to form a toner image. A recording medium S such as a paper sheet is received in a sheet-feeding unit 900. The recording medium S fed from the sheet-feeding unit 900 by a pickup roller 91 is conveyed by sheet feeding rollers 600 to a transfer position at which the photosensitive drum 500 and a transfer roller 53 are held in contact with each other. The toner image formed on the photosensitive drum 500 is transferred onto the recording medium S by the transfer roller 53 at the transfer position. The toner image transferred onto the recording medium S is heated and pressurized by a fixing device 700 to be fixed to the recording medium S. The recording medium S having an image formed thereon is delivered to a delivery tray 54 by delivery rollers 800.

<Light Scanning Apparatus>

Figure 2:
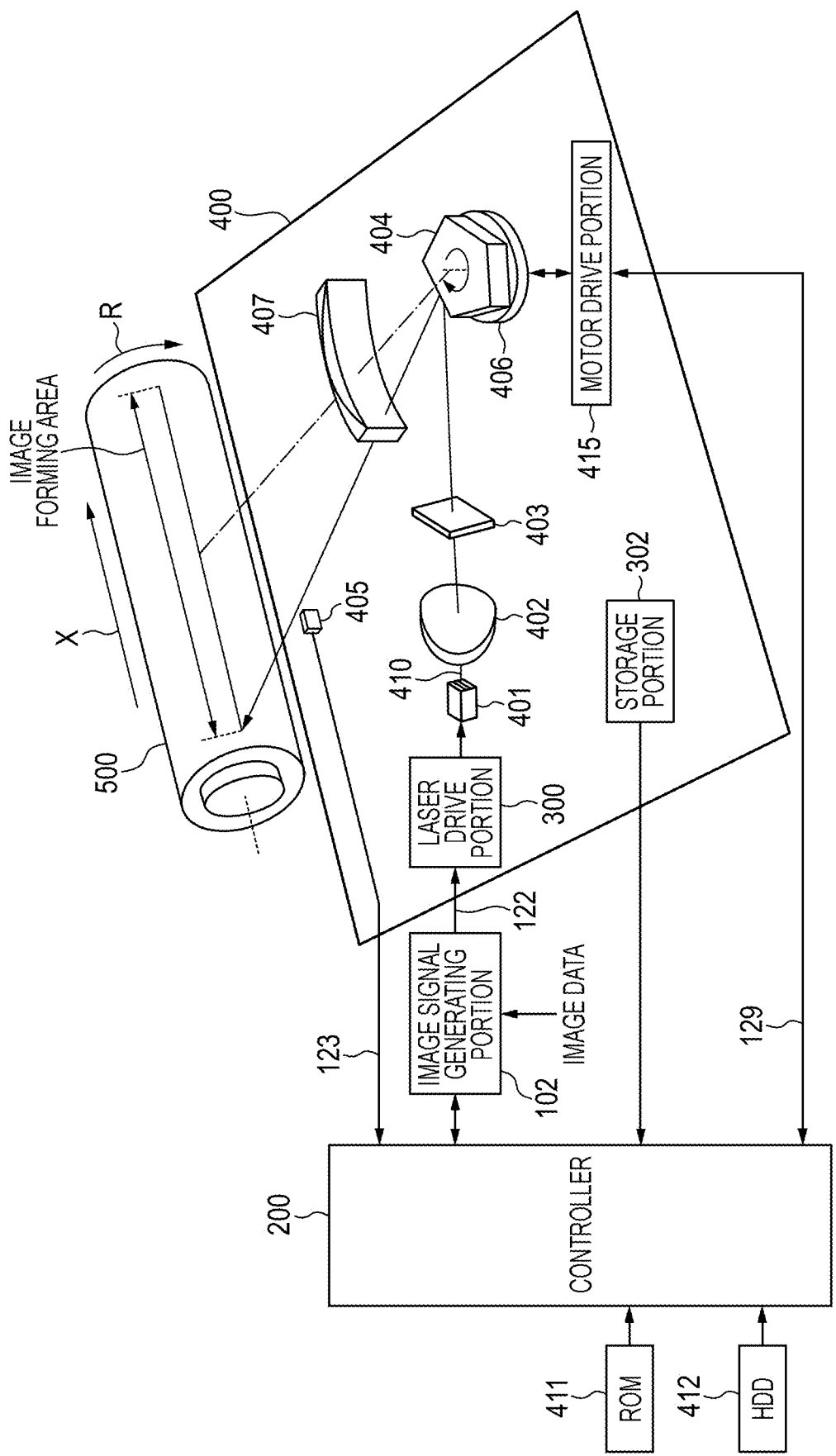
FIG. 2 is an explanatory illustration of a light scanning apparatus.

FIG. 2 is an explanatory illustration of the light scanning apparatus 400. The light scanning apparatus 400 includes a light source (semiconductor laser) 401, a collimator lens 402, a cylindrical lens 403, a motor 406, a rotary polygon mirror 404, an imaging lens 407, a beam detector (hereinafter referred to as "BD") 405 serving as a light receiver, and a storage portion 302. The light scanning apparatus 400 further includes the laser drive portion 300 and a motor drive portion 415 as a drive system. The laser drive portion 300 is configured to supply a current to the light source 401 based on the VDO signal 122 of the controller 200 to cause the light source 401 to emit the light beam 410. The light source 401 includes a plurality of light emitting points (laser elements). The light beam 410 is formed of a plurality of light beams (multibeam) emitted from the plurality of light emitting points of the light source 401. The collimator lens 402 collimates the light beam 410. The light beam 410 that has passed through the collimator lens 402 is condensed by the cylindrical lens 403 in a sub-scanning direction (direction corresponding to a rotation direction R of the photosensitive drum 500). The rotary polygon mirror 404 serving as a deflection device has a plurality of reflection surfaces. The rotary polygon mirror 404 of the embodiment has five reflection surfaces. However, the number of reflection surfaces is not limited to five. The rotary polygon mirror 404 is mounted to a rotary shaft of the motor 406 and is rotated integrally with the motor 406. The rotary polygon mirror 404 is configured to deflect the light beam 410 so that the light beam 410 emitted from the light source 401 scans the surface of the photosensitive drum 500. The light beam 410 that has been deflected is imaged as a light spot on the surface of the photosensitive drum 500 by the imaging lens 407. The light scanning apparatus 400 and the photosensitive drum 500 are positioned so that the light beam 410 scans the surface of the photosensitive drum 500 in a main scanning direction X that is parallel to the rotary shaft of the photosensitive drum 500. At each time the light beam 410 deflected by one reflection surface of the rotary polygon mirror 404 scans the surface of the photosensitive drum 500 once, scanning lines corresponding to the number of light emitting points of the light source 401 are formed simultaneously on the surface of the photosensitive drum 500. The light beam 410 deflected by the rotary polygon mirror 404 forms an electrostatic latent image in an image forming area of the photosensitive drum 500.

The light beam 410 deflected by the rotary polygon mirror 404 enters the BD 405 in a non-image forming area located outside the image forming area of the photosensitive drum 500. When the BD 405 detects the light beam 410, the BD 405 outputs a beam detection signal (hereinafter referred to as "BD signal") 123 serving as a main scanning synchronization signal for fixing a writing start position of the electrostatic latent image in the main scanning direction X. The controller 200 is configured to determine a writing start timing of the light beam 410 for each scanning line based on the BD signal 123 output from the BD 405. Further, the controller 200 is configured to count (measure) time intervals of the BD signal 123 to measure a rotation speed of the rotary polygon mirror 404. The controller 200 is configured to output an acceleration/deceleration signal 129 for instructing acceleration and deceleration to the motor drive portion 415 so that the rotary polygon mirror 404 rotates at a predetermined speed. The motor drive portion 415 is configured to control the rotation speed of the motor 406 by supplying a drive current to the motor 406 of the rotary polygon mirror 404 in accordance with the input acceleration/deceleration signal 129. The controller 200 includes a CPU and a RAM. The controller 200 reads a program stored in a ROM 411 or an HDD 412, loads the program to the RAM, and controls the CPU to execute the program, to thereby achieve various control processes including a scanning control process for the light beam.

<Control System>

Figure 3:
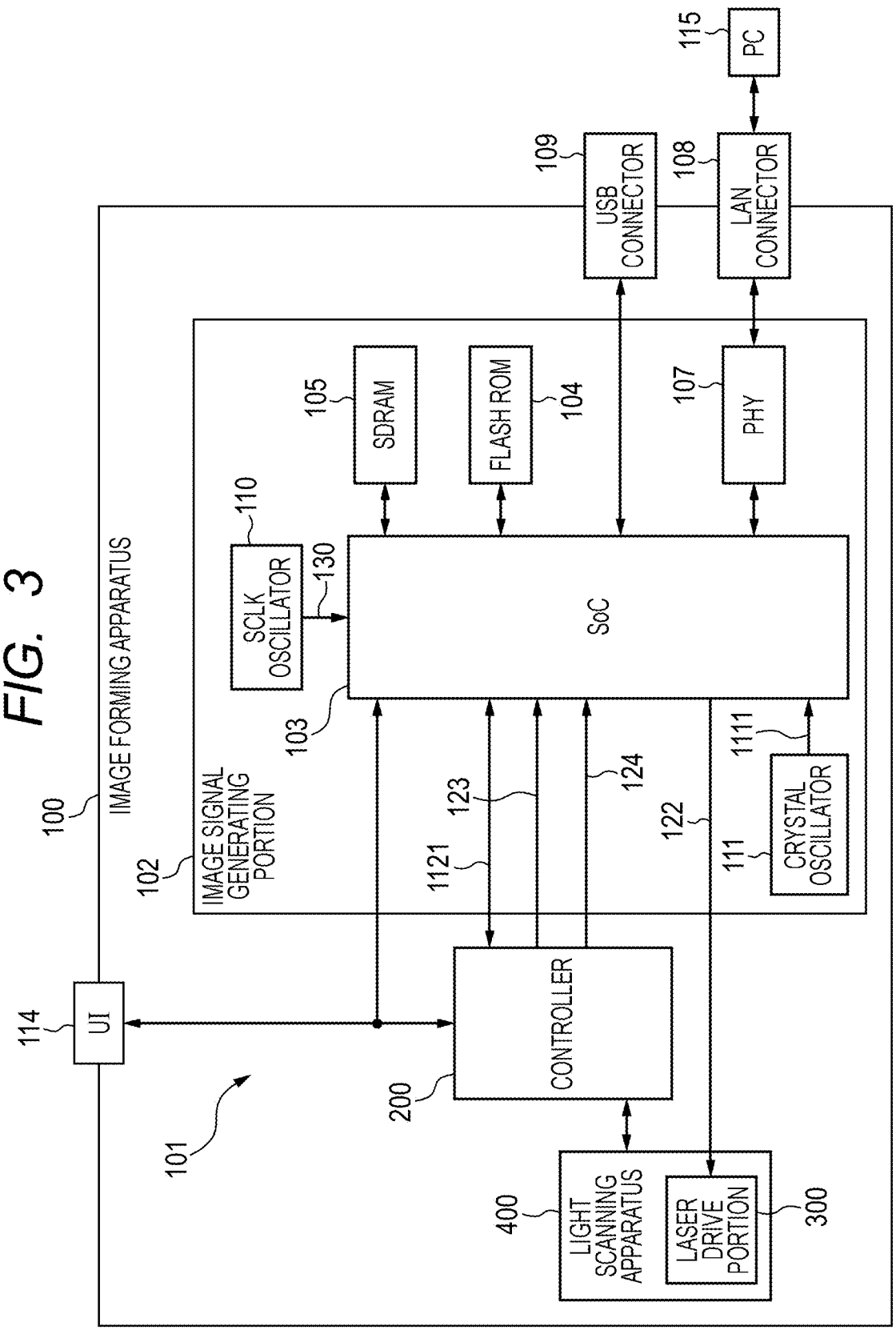
FIG. 3 is a block diagram of a control system of the image forming apparatus.

FIG. 3 is a block diagram of a control system 101 of the image forming apparatus 100. The control system 101 includes the controller 200, an image signal generating portion 102, a user interface (hereinafter referred to as "UI") 114, and the light scanning apparatus 400. The controller 200 is configured to control the entire image forming apparatus 100. The image signal generating portion 102 is configured to convert image data (print request data), which is transmitted from a personal computer (hereinafter referred to as "PC") 115, into the VDO signal 122. The image signal generating portion 102 transmits the VDO signal 122 to the light scanning apparatus 400 based on the BD signal 123. The image signal generating portion 102 includes a system-on-chip (hereinafter referred to as "SoC") 103, a flash ROM 104, an SDRAM 105, a physical layer (hereinafter referred to as "PHY") 107, a system clock oscillator (hereinafter referred to as "SCLK oscillator") 110, and a crystal oscillator 111.

Figure 4:
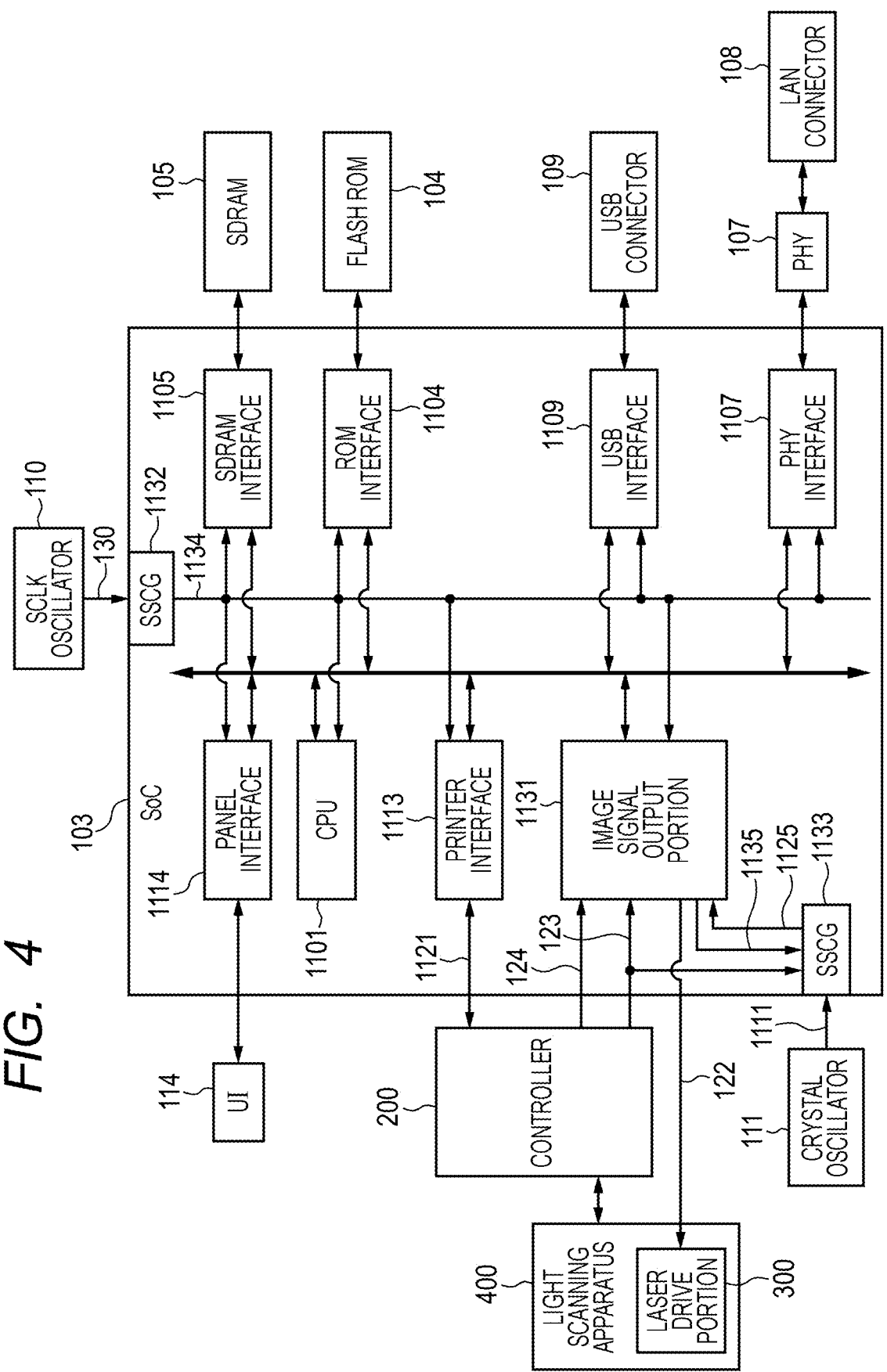
FIG. 4 is a block diagram of a SoC.

The SoC 103 is an integrated circuit which is obtained by integrating required control functions in one semiconductor chip. The SoC 103 has built therein a CPU 1101 (FIG. 4). The SoC 103 is configured to control memories (storage portions) such as the flash ROM 104 and the SDRAM 105, and communicate with the controller 200. Further, the SoC 103 is configured to receive image data from the PC 115 through a local area network (LAN) connected to a LAN connector 108, and receive image data from a peripheral device (hereinafter referred to as "USB device") connected to a USB connector 109. The SoC 103 includes a circuit that is configured to execute an algorithm for suppressing toner scattering during the fixing process and a circuit that is configured to execute an algorithm for correcting partial magnification, which will be described later. The flash ROM 104 serving as the storage portion is configured to store a program code for operation of the CPU 1101 (FIG. 4) built in the SoC 103, and store data. The flash ROM 104 is capable of changing the program code as needed. The SDRAM 105 may be, for example, an SDR-SDRAM or a DDR (1, 2, 3, 4, 5)-SDRAM. The SDRAM 105 is configured to load the program code stored in the flash ROM 104, store image data, and store transient data for the program.

The PHY 107 is a driver/receiver IC for data communication in the LAN connected to the LAN connector 108. The PHY 107 supports transfer speeds of, for example, 10 Mbps, 100 Mbps, and 1,000 Mbps (1 Gbps). In the embodiment, an RJ45 connector is used as the LAN connector 108. Connection of a LAN cable (wired) to the LAN connector 108 enables image formation to be performed by the image forming apparatus 100 via the local area network. The image signal generating portion 102 has built-in software for using a remote UI. Through use of the remote UI, a state of the image forming apparatus 100 can be displayed on the PC 115 via the LAN connector 108. Further, setting of the image forming apparatus 100 can be performed from the PC 115 with use of the remote UI. The USB connector 109 is a USB device interface. The transfer speed of the USB connector 109 is determined based on USB standards such as USB 1.1 and USB 2.0. The SCLK oscillator 110 is configured to output, to the SoC 103, a system clock (hereinafter referred to as "SCLK") 130 serving as a reference clock signal for operating the process of the SoC 103. The crystal oscillator 111 is configured to output, to the SoC 103, a reference clock signal (hereinafter referred to as REFCLK) 1111 for generating a video clock (hereinafter referred to as "VCLK") 1125 (FIG. 4) for outputting the VDO signal 122.

FIG. 4 is a block diagram of the SoC 103. The SoC 103 includes a spread spectrum clock generator (hereinafter referred to as "SSCG") 1132, a ROM interface 1104, an SDRAM interface 1105, a PHY interface 1107, and a panel interface 1114. The SoC 103 further includes the CPU 1101, a printer interface 1113, and an image signal output portion 1131. The SCLK 130 output from the SCLK oscillator 110 is input to the SSCG 1132 provided in the SoC 103. The SSCG 1132 is configured to output a spread spectrum clock 1134. The ROM interface 1104, the SDRAM interface 1105, the printer interface 1113, the panel interface 1114, and the image signal output portion 1131 are controlled based on the spread spectrum clock 1134.

The CPU 1101 is configured to control the entire image signal generating portion 102. The ROM interface 1104 is configured to control the flash ROM 104. The SDRAM interface 1105 is configured to control the SDRAM 105. The PHY interface 1107 is a general-purpose interface such as MII, and is configured to control the PHY 107. The USB interface 1109 is configured to control the USB connector 109. The printer interface 1113 is configured to control the controller 200 with use of a printer interface signal 1121. The panel interface 1114 is configured to control the UI 114.

The CPU 1101 is configured to convert a page description language (PDL), which is received from a USB device connected to the USB connector 109 or from the LAN connected to the LAN connector 108, into binary (monochromatic) image data in a bitmap format. The CPU 1101 stores the binary image data in the bitmap format in the SDRAM 105 through the SDRAM interface 1105. The image signal output portion 1131 acquires the binary image data in the bitmap format stored in the SDRAM 105 by a direct memory access (DMA) through the SDRAM interface 1105. The image signal output portion 1131 generates the VDO signal 122 based on the binary image data.

The REFCLK 1111 output from the crystal oscillator 111 is input to a spread spectrum clock generator (hereinafter referred to as "SSCG") 1133 provided in the SoC 103. The SSCG 1133 serving as a frequency modulation portion includes a phase locked loop (hereinafter referred to as "PLL"). The PLL of the SSCG 1133 is configured to modulate a frequency of the REFCLK 1111 serving as a source oscillation to generate a video clock (hereinafter referred to as "VCLK") 1125. The SSCG 1133 is configured to output the VCLK 1125 to the image signal output portion 1131. The image signal output portion 1131 is configured to output, based on the VCLK 1125, respective VDO signals 122 of a plurality of beams to the laser drive portion 300 of the light scanning apparatus 400.

The optical system of the light scanning apparatus 400 of the embodiment uses the imaging lens 407 that does not have the fθ characteristic or that has a mild fθ characteristic. That is, a movement distance of the light spot, which is imaged on the surface of the photosensitive drum 500 by the imaging lens 407, in the main scanning direction is not proportional to a rotation angle (deflection angle) of the rotary polygon mirror 404 which deflects the light beam. Therefore, the partial magnification in the main scanning direction X changes in accordance with a position in the main scanning direction X. The partial magnification in the main scanning direction X changes, and hence a pixel width changes in accordance with a position in the main scanning direction X. Further, the light intensity per unit length changes. In the following, a description will be provided of a partial magnification change, which is a change in pixel width in accordance with a position in the main scanning direction X, and a partial light intensity change, which is a change in light intensity per unit length in accordance with a position in the main scanning direction X.

(Partial Magnification Change)

Figure 5:
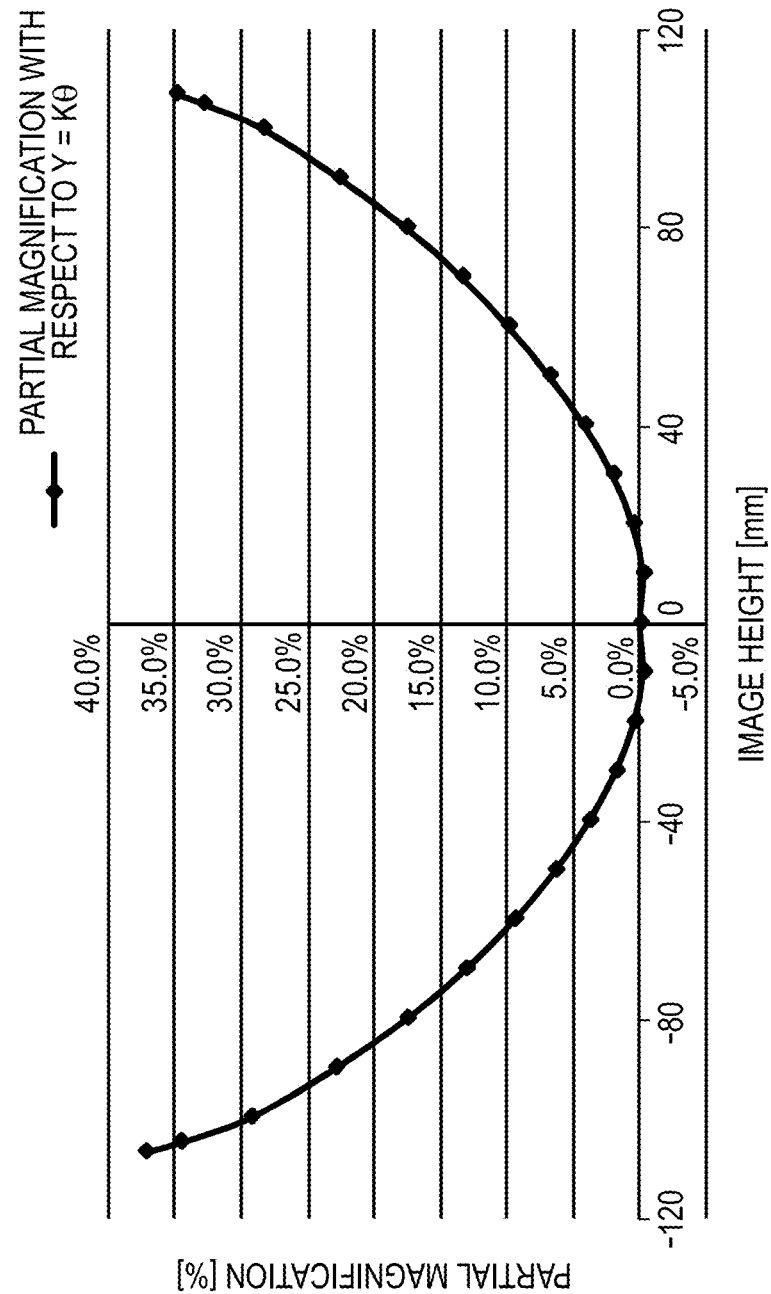
FIG. 5 is a graph for showing a partial magnification with respect to an image height for the light scanning apparatus.

FIG. 5 is a graph for showing the partial magnification (%) with respect to an image height Y (mm) for the light scanning apparatus 400. In FIG. 5, there is shown a relationship between the image height Y and the partial magnification, which is exhibited when the image height Y on the surface of the photosensitive drum 500 is expressed by the scanning characteristic of Y=Kθ. When the imaging lens 407 has the scanning characteristic of Y=Kθ, as shown in FIG. 5, the partial magnification increases as the image height becomes farther from an on-axis image height (Y=0) and closer to respective outermost off-axis image heights (Y=+Ymax and Y=−Ymax). This is because the scanning speed gradually increases as the image height becomes farther from the on-axis image height and closer to the outermost off-axis image height. The on-axis image height represents the image height on the optical axis of the imaging lens 407. The on-axis image height is an image height Y (Y=0=Ymin) exhibited when a scanning angle θ is 0 (θ=0). Further, in the embodiment, an image height (Y≠0) at a position (θ≠0) deviated from the optical axis (θ=0) of the imaging lens 407 is referred to as "off-axis image height". It can be understood from FIG. 5 that the scanning speed at both end portions is higher than the scanning speed at the center by about 35%. As a result, an image magnification is larger at both end portions of the recording medium than at the center. The extension of the image by the partial magnification can be corrected to an image having an original dimension by correcting the VDO signal 122 with a correction magnification obtained based on an inverse number of a number obtained by adding 100% to a partial magnification of each pixel.

For example, the partial magnification of 30% means that, when the light beam is scanned in the main scanning direction X for a unit time, a length (hereinafter referred to as "scanning length") by which the surface (scanned surface) of the photosensitive drum 500 is scanned with the light beam is 1.3 times longer than a scanning length at the on-axis image height. Thus, in a case in which a period of the VCLK 1125 is constant, when a pixel width in the main scanning direction X is determined based on a fixed time interval determined by the period of the VCLK 1125, a scanning length per pixel differs between at the on-axis image height (Y=0) and at the off-axis image height (Y≠0). Therefore, the scanning length per pixel in the main scanning direction X at the off-axis image height (Y≠0) becomes longer than the scanning length per pixel in the main scanning direction X at the on-axis image height (Y=0), and a pixel density changes depending on the image height (position in the main scanning direction X). Further, the scanning speed gradually becomes higher as the image height Y becomes farther from the on-axis image height and closer to the outermost off-axis image height (as the absolute value of the image height Y becomes larger). Therefore, a time required for the light spot near the outermost off-axis image height to scan the scanned surface by a unit length is shorter than a time required for the light spot near the on-axis image height to scan the scanned surface by the unit length. This means that, when the light emission brightness of the light source 401 is constant, an exposure amount per unit length for an image height near the outermost off-axis image height becomes smaller than an exposure amount per unit length for an image height near the on-axis image height.

(Partial Light Intensity Change)

Figure 6A:
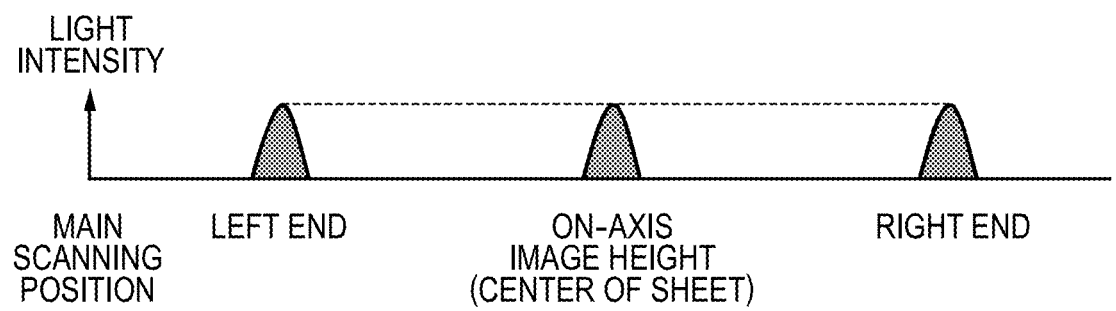
FIG. 6A and FIG. 6B are graphs for showing a light intensity which changes in accordance with a main scanning position.
Figure 6B:
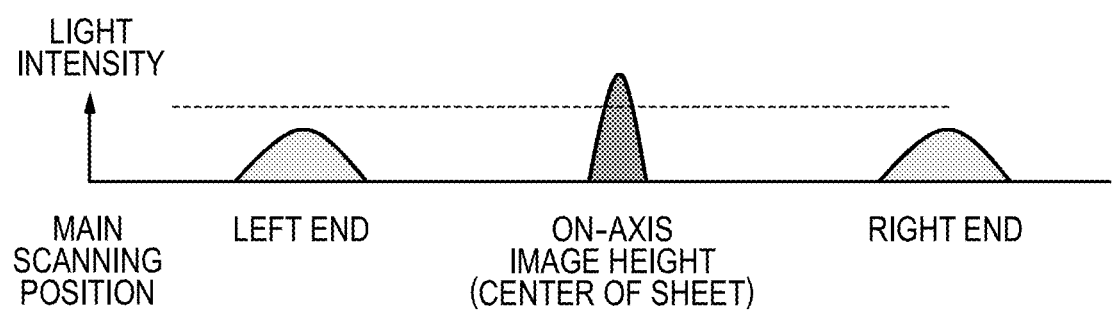

With reference to FIG. 6A and FIG. 6B, description is made of a light intensity per unit length (partial light intensity) on the surface (scanned surface) of the photosensitive drum 500, which changes in accordance with a position in the main scanning direction X (hereinafter referred to as "main scanning position"). FIG. 6A and FIG. 6B are graphs for showing the light intensity which changes in accordance with the main scanning position. FIG. 6A is a graph for schematically showing a relationship between the main scanning position and the light intensity in the case in which an imaging lens having the fθ characteristic is used. FIG. 6B is a graph for schematically showing a relationship between the main scanning position and the light intensity in the case in which the imaging lens 407 that does not have the fθ characteristic or that has the mild fθ characteristic is used. When the imaging lens having the fθ characteristic is used, as shown in FIG. 6A, the light intensity per unit length on the scanned surface is constant with respect to the main scanning positions. However, in the case in which the imaging lens 407 that does not have the fθ characteristic or that has the mild fθ characteristic is used, when a current supplied to the light source 401 is constant, as shown in FIG. 6B, the light intensity per unit length on the scanned surface changes with respect to the main scanning positions. The scanning speed for one pixel having an outermost off-axis image height (both ends of sheet) becomes higher than the scanning speed for one pixel having an on-axis image height (center of sheet). Therefore, the light intensity is smaller at the outermost off-axis image height (both ends of sheet), and the light intensity is larger at the on-axis image height (center of sheet). As described above, the light intensity becomes smaller at both ends of the sheet, whereas the light intensity becomes larger at the center of the sheet. In that case, the toner laid-on level becomes higher at the center of the sheet. Therefore, toner scattering may occur during the fixing process. When the imaging lens 407 that does not have the fθ characteristic or that has the mild fθ characteristic is used, the amount of toner scattering during the fixing process changes in accordance with the main scanning position.

In the case of the imaging lens 407 having such a scanning characteristic as described above, variation in partial magnification in accordance with the main scanning position and variation in exposure amount per unit length in accordance with the main scanning position may exert adverse influence in maintaining satisfactory image quality. In view of this, in the embodiment, in order to obtain satisfactory image quality, a pixel value conversion process for correcting the light intensity per unit length and partial magnification correction for correcting variation in partial magnification in accordance with the main scanning position are performed.

(Pixel Value Conversion Process)

Figure 7:
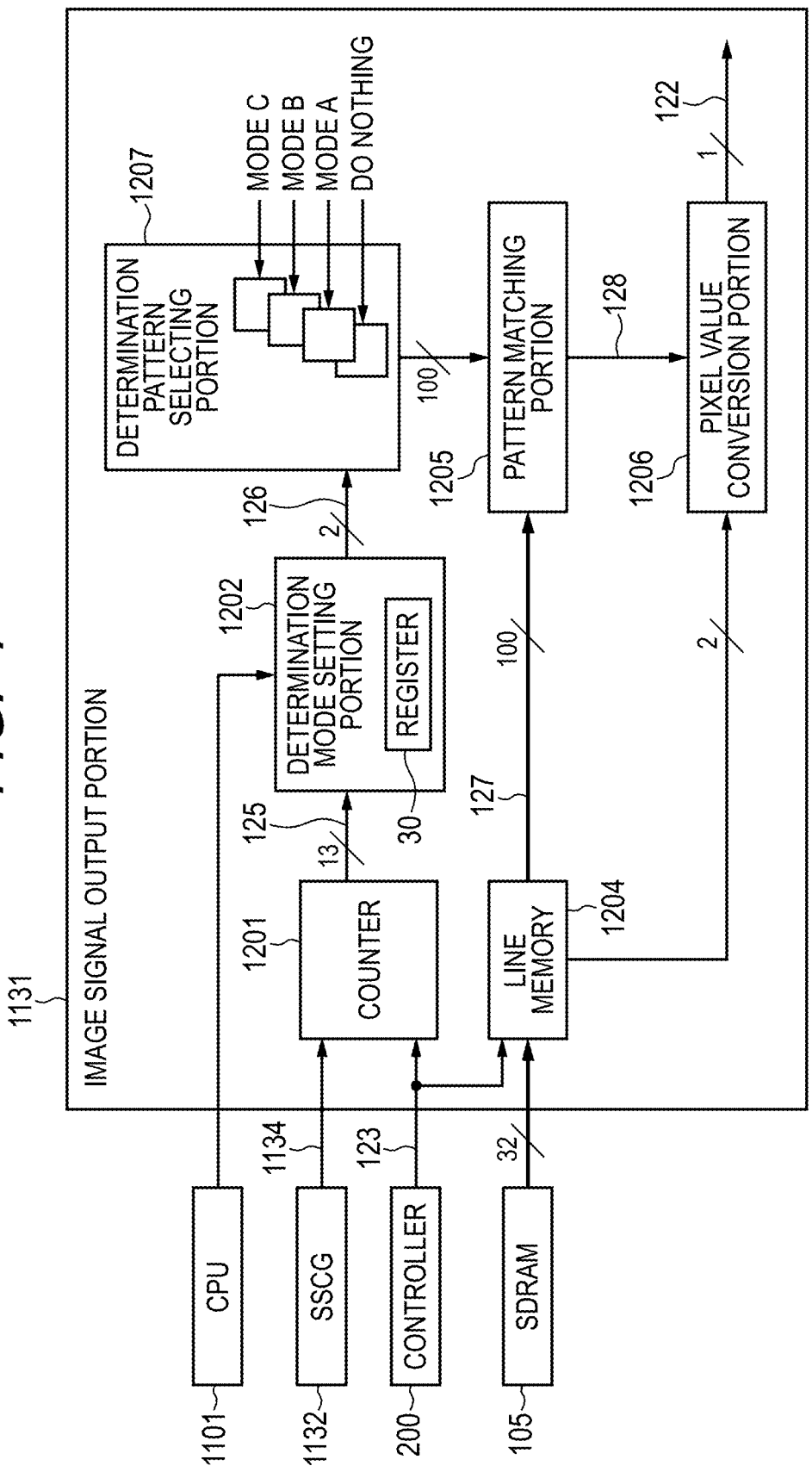
FIG. 7 is a block diagram of an image signal output portion.

Description is made of the pixel value conversion process for reducing the toner scattering caused by the change in partial light intensity in the main scanning direction. In the pixel value conversion process, a pixel value of a main scanning position having a large light intensity per unit length is converted from black (1) to white (0), to thereby reduce the light intensity per unit length. The pixel value conversion process is performed by the image signal output portion 1131. FIG. 7 is a block diagram of the image signal output portion 1131. The image signal output portion 1131 includes a counter 1201, a determination mode setting portion 1202, a line memory 1204, a pattern matching portion 1205, a pixel value conversion portion 1206, and a determination pattern selecting portion 1207. The image signal output portion 1131 acquires binary image data in the bitmap format by the direct memory access from the SDRAM 105 through the SDRAM interface 1105. The image data is input to the line memory 1204. The image signal output portion 1131 performs pattern matching with a change in determination patterns in accordance with a pixel position in the main scanning direction, and executes the pixel value conversion process of converting the pixel value from black (1) to white (0). The pixel value conversion process is controlled based on the spread spectrum clock 1134 of the SSCG 1132.

The counter 1201 counts the spread spectrum clock 1134 output from the SSCG 1132. A count value 125 of the spread spectrum clock 1134 corresponds to the number of pixels in the main scanning direction. The count value 125 of the counter 1201 is reset by input of the BD signal 123. The count value 125 of the counter 1201 is reset and incremented in unit of one scanning (one line). When the resolution of the image forming apparatus 100 is, for example, 600 dpi, and an image is formed on an A4-size sheet, the counter 1201 counts up to about 6,000. The count value 125 of the counter 1201 is reset to 0 each time the BD signal 123 is input, and is counted up again. The counter 1201 counts up the pixels irrespective of whether the image is black or white, and outputs the count value 125 which indicates a print position (pixel position) in the main scanning direction to which a current dot (image) is output.

Figure 8A:
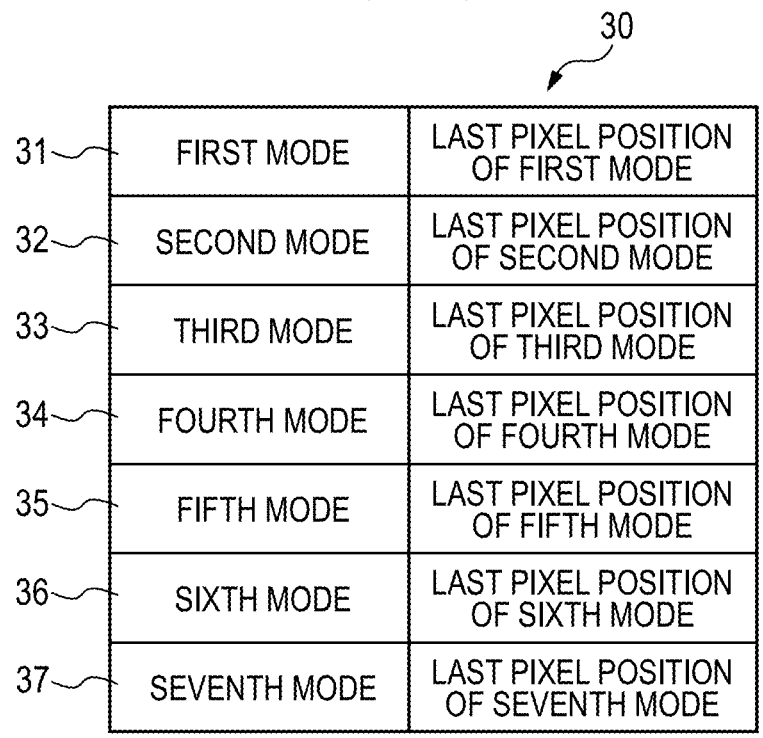
FIG. 8A and FIG. 8B are explanatory tables for showing values stored in a register of a determination mode setting portion.
Figure 8B:
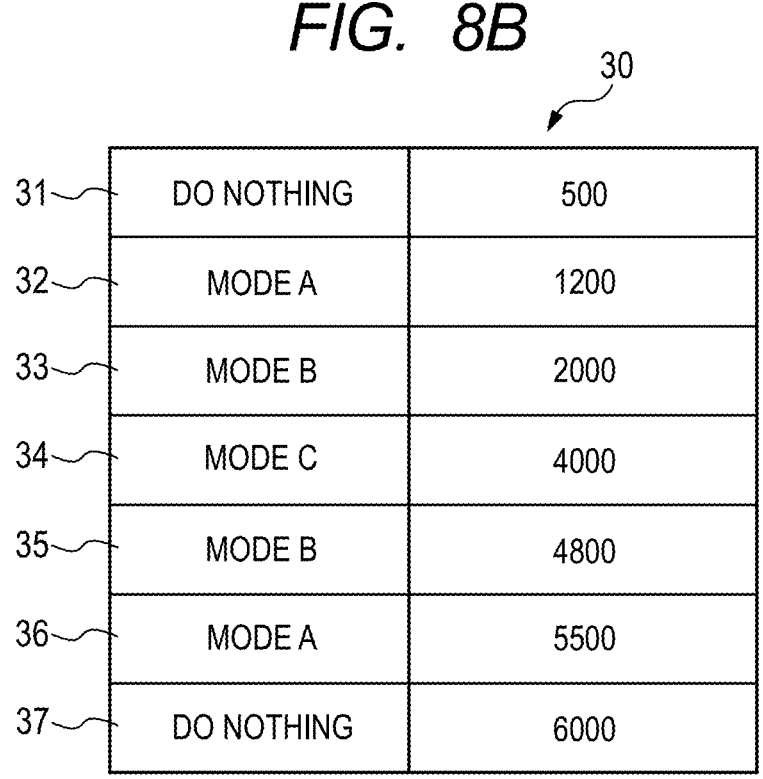

The determination mode setting portion 1202 includes a register 30 which is written by software through the CPU 1101. FIG. 8A and FIG. 8B are explanatory tables for showing values stored in the register 30 of the determination mode setting portion 1202. The register 30 stores determination modes and pixel positions. The determination mode setting portion 1202 sets a plurality of modes to a plurality of divided areas which are obtained by dividing the scanning area in which an image is formed. For the plurality of modes, there are set zero, one, or two or more lines in which pixel values of image data are changed. The determination mode setting portion 1202 compares the count value 125, which is output from the counter 1201, with pixel positions stored in advance in the register 30, and outputs a comparison result 126 to the determination pattern selecting portion 1207. The determination pattern selecting portion 1207 selects, based on the comparison result 126 output from the determination mode setting portion 1202, one or two or more types of determination patterns to be used from a plurality of types of determination patterns.

The line memory 1204 is a storage portion which stores image data. The pixel value conversion process is executed with a matrix of 10×10 pixels. Therefore, the line memory 1204 has a storage capacity that is sufficient to store image data for at least ten lines. The line memory 1204 outputs data 127 of 10×10 pixels to the pattern matching portion 1205. The pattern matching portion 1205 compares a determination pattern of a type selected by the determination pattern selecting portion 1207 with the data 127 of 10×10 pixels, which is input from the line memory 1204. When the determination pattern of the selected type matches with the data 127 of 10×10 pixels, the pattern matching portion 1205 outputs, to the pixel value conversion portion 1206, a true signal 128 indicating conversion of a value of a target value of FIG. 11A to FIG. 11C described later from 1 (black) to 0 (white). The operation of the pattern matching portion 1205 will be described later with reference to FIG. 11A to FIG. 11C. The line memory 1204 outputs bit data of a target pixel and bit data of an adjacent pixel in the main scanning direction to the pixel value conversion portion 1206. That is, the data 127 of 10×10 pixels is output with a shift of two pixels in the main scanning direction. When the true signal 128 is input from the pattern matching portion 1205, the pixel value conversion portion 1206 converts a value of the target pixel from 1 (black) to 0 (white). The pixel value conversion portion 1206 generates the VDO signal 122 that has been subjected to the pixel value conversion process (dot-extraction process).

(Modes)

Figure 9A:
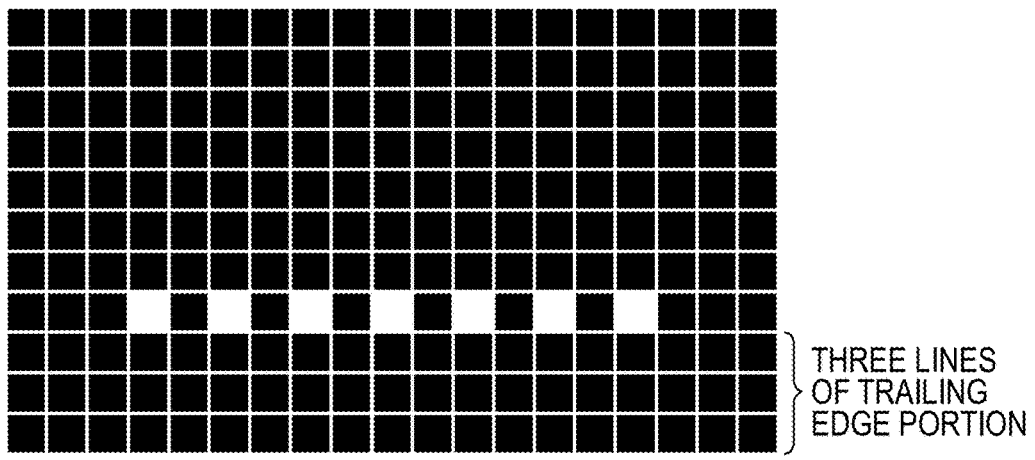
FIG. 9A, FIG. 9B, and FIG. 9C are explanatory views of modes of executing a pixel value conversion process.
Figure 9B:
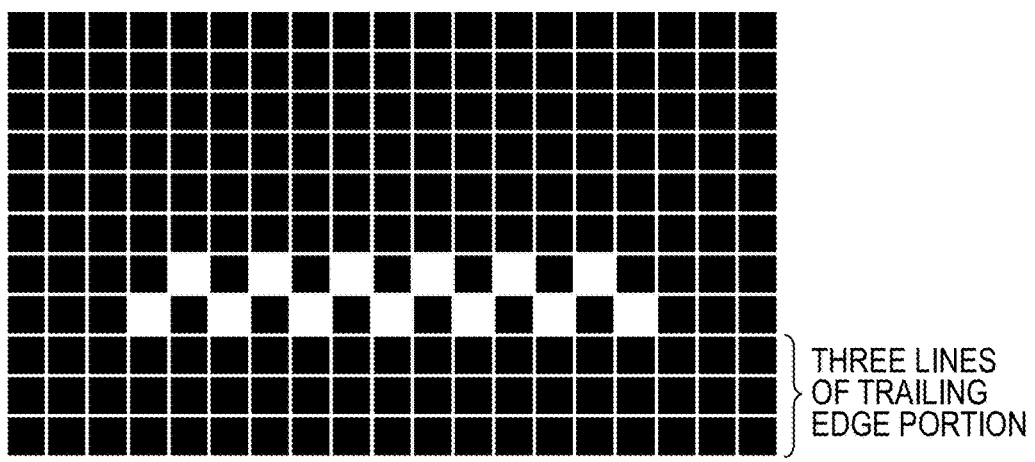
Figure 9C:
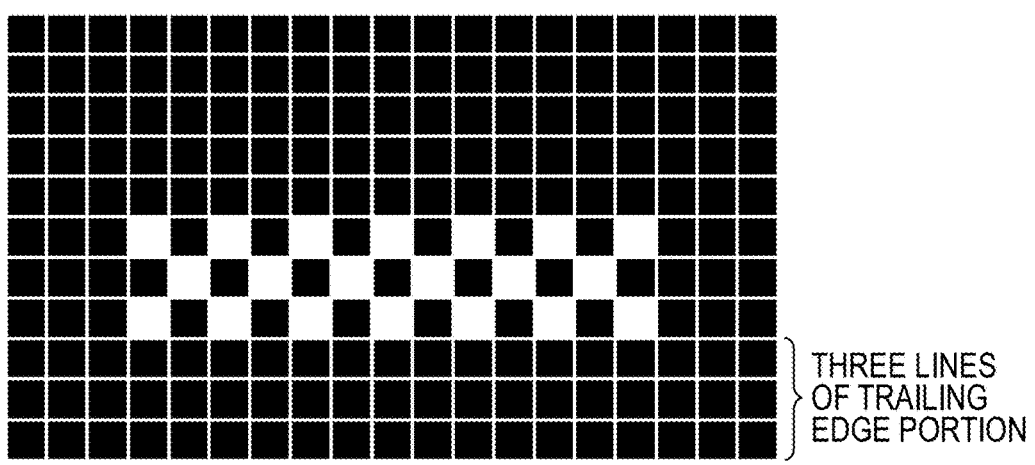

FIG. 9A, FIG. 9B, and FIG. 9C are explanatory views of modes of executing the pixel value conversion process. The pixel value conversion process for suppressing toner scattering during the fixing process in the case in which the image lens that does not have the fθ characteristic or that has the mild fθ characteristic is used is executed in a plurality of different modes in accordance with a main scanning position. FIG. 9A is an explanatory view of the pixel value conversion process in a mode A. In the mode A, a pixel value is converted from 1 (black) to 0 (white) in one line (hereinafter also referred to as "dot is extracted"). In the mode A, dots in three lines from a trailing edge of an image are not extracted, and dots in a fourth line from the trailing edge are extracted every other pixel. FIG. 9B is an explanatory view of the pixel value conversion process in a mode B. In the mode B, a pixel value is converted from 1 (black) to 0 (white) in two lines. In the mode B, dots in three lines from the trailing edge of the image are not extracted, and dots in a fourth line and a fifth line from the trailing edge are extracted alternately. FIG. 9C is an explanatory illustration of the pixel value conversion process in a mode C. In the mode C, a pixel value is converted from 1 (black) to 0 (white) in three lines. In the mode C, dots in three lines from a trailing edge of an image are not extracted, and dots in a fourth line, a fifth line, and a sixth line from the trailing edge are extracted alternately. In any of the modes, the pixel values of images for three lines from the trailing edge of the image are not converted. This is because, when the pixel values of the images for three lines (predetermined number of lines) from the trailing edge of the image are converted, thin lines of characters and the like may be blurred. The number of lines of the trailing edge of the image, which are not subjected to the conversion of the pixel values, is not limited to three, and may suitably be changed to a predetermined number such as two or four. In the embodiment, the number of lines of the trailing edge of the image, which are not subjected to the conversion of the pixel values, is constant in all of the modes, but may be changed for each mode. In the embodiment, the pixel value conversion process is performed to reduce the toner scattering during the fixing process. However, when the thin lines of characters are blurred, the extent of the pixel value conversion process may be reduced.

(Scanning Area)

Figure 10:
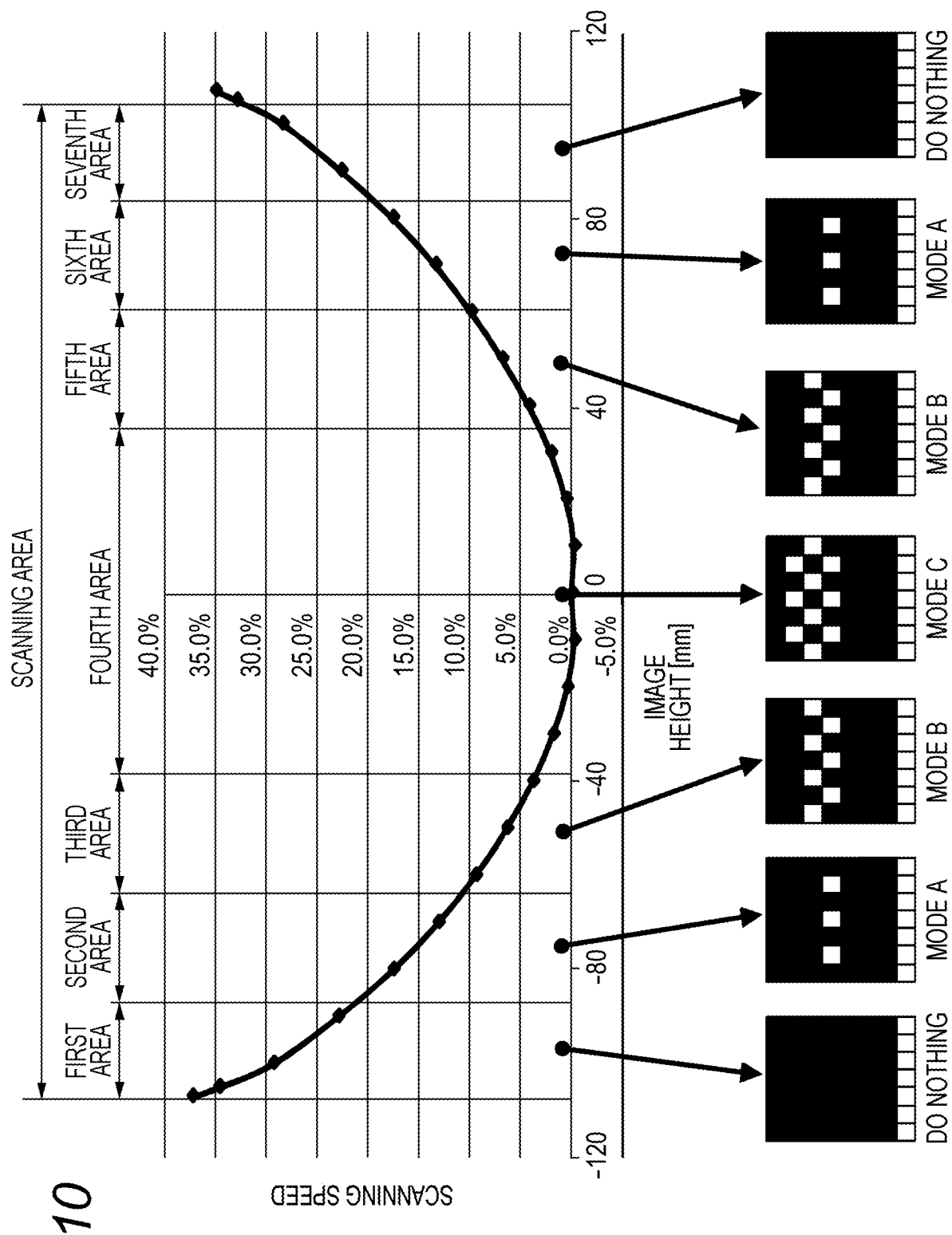
FIG. 10 is an explanatory illustration of a relationship between divided areas and the modes.

In the embodiment, the scanning area in the main scanning direction in which an image is formed is divided into a plurality of areas, and the modes are switched in accordance with the divided areas. FIG. 10 is an explanatory illustration of a relationship between the divided areas and the modes. When the imaging lens 407 that does not have the fθ characteristic or that has the mild fθ characteristic is used, as described above with reference to FIG. 6B, the light intensity becomes larger at the center of the sheet, and the light intensity becomes smaller at both ends of the sheet. The toner scattering during the fixing process may occur when the light intensity is large (charge amount is large). Thus, the toner scattering is liable to occur at the center of the sheet, and the toner scattering becomes less liable to occur gradually toward ends of the sheet. As illustrated in FIG. 10, in the embodiment, the scanning area in the main scanning direction in which the image is formed is divided into seven areas. The pixel value conversion process is performed in an optimum mode for each divided area. The number of divided areas is not limited to seven. The number of divided areas may be any suitable number such as five, six, eight, or nine. The image signal output portion 1131 is capable of suitably setting the division number of the scanning area and a width (length) of the divided area in the main scanning direction. The number of registers 30 can be changed in accordance with the number of divided areas. The determination mode setting portion 1202 functions as a unit for changing the number of divided areas and the width of the divided area.

In the embodiment, in a first area and a seventh area at both ends of the sheet, the pixel value conversion process is not performed. In a second area and a sixth area, the pixel value conversion process is performed for one line in the mode A illustrated in FIG. 9A. In a third area and a fifth area, the pixel value conversion process is performed for two lines in the mode B illustrated in FIG. 9B. In a fourth area at the center of the sheet, the pixel value conversion process is performed for three lines in the mode C illustrated in FIG. 9C. As described above, the modes of the pixel value conversion process are changed in accordance with the main scanning positions, thereby being capable of suppressing the toner scattering during the fixing process while preventing blurring of thin lines of the characters and the like.

(Control Operation for Pixel Value Conversion Process)

Figures 11A, 11B, 11C:
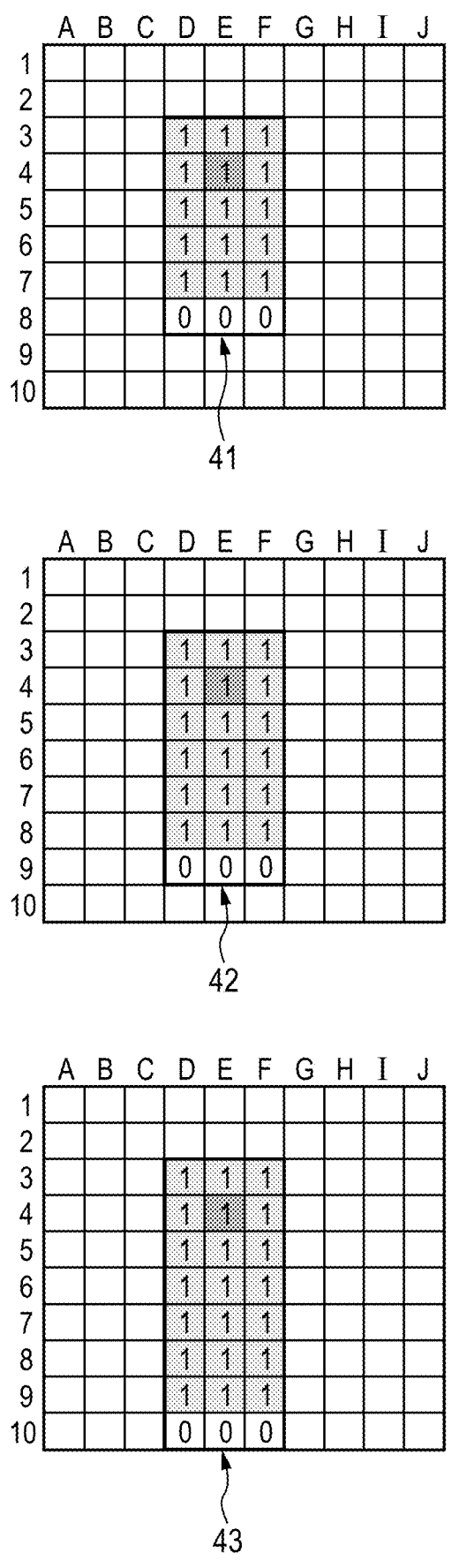

Next, with reference to FIG. 11A, FIG. 11B, and FIG. 11C, description is made of a control operation for the pixel value conversion process for suppressing the toner scattering during the fixing process. FIG. 11A, FIG. 11B, and FIG. 11C are illustrations of types of the determination patterns. FIG. 11A is an illustration of a determination pattern 41 of a type I. The determination pattern 41 of the type I has a window of 3×6 pixels including a target pixel P(4,E). The window of 3×6 pixels includes eighteen pixels of (rows 3 to 8)× (columns D to F), that is, one row above, four rows below, one column on the left, and one column on the right with respect to the target pixel P(4,E). In the case of the determination pattern 41 of the type I, eighteen pixels in total, which include the target pixel P(4,E) and peripheral pixels, are subjected to the determination. In the determination pattern 41 of the type I, a value of fifteen pixels of (rows 3 to 7)×(columns D to F) is 1, whereas a value of a pixel P(8,D), a pixel P(8,E), and a pixel P(8,F) is 0. A value of first to third rows below the target pixel P(4,E) is 1, and a value of the fourth row is 0, thereby preventing dots from being extracted in three lines of the trailing edge portion of the image. With this configuration, degradation of an image having thin lines can be prevented. When a value of all of pixels in the window of 3×6 pixels matches with the determination pattern 41 of the type I, a value of the target pixel P(4,E) is converted from 1 (black) to 0 (white).

FIG. 11B is an illustration of a determination pattern 42 of a type II. The determination pattern 42 of the type II has a window of 3×7 pixels including the target pixel P(4,E). The window of 3×7 pixels includes twenty-one pixels of (rows 3 to 9)×(columns D to F), that is, one row above, five rows below, one column on the left, and one column on the right with respect to the target pixel P(4,E). In the case of the determination pattern 42 of the type II, twenty-one pixels in total, which include the target pixel P(4,E) and peripheral pixels, are subjected to the determination. In the determination pattern 42 of the type II, a value of eighteen pixels of (rows 3 to 8)×(columns D to F) is 1, whereas a value of a pixel P(9,D), a pixel P(9,E), and a pixel P(9,F) is 0. A value of first to fourth rows below the target pixel P(4,E) is 1, and a value of the fifth row is 0, thereby preventing dots from being extracted in three lines of the trailing edge portion of the image. With this configuration, degradation of an image having thin lines can be prevented. When a value of all of pixels in the window of 3×7 pixels matches with the determination pattern 42 of the type II, the value of the target pixel P(4,E) is converted from 1 (black) to 0 (white).

FIG. 11C is an illustration of a determination pattern 43 of a type III. The determination pattern 43 of the type III has a window of 3×8 pixels including the target pixel P(4,E). The window of 3×8 pixels includes twenty-four pixels of (rows 3 to 10)×(columns D to F), that is, one row above, six rows below, one column on the left, and one column on the right with respect to the target pixel P(4,E). In the case of the determination pattern 43 of the type III, twenty-four pixels in total, which include the target pixel P(4,E) and peripheral pixels, are subjected to the determination. In the determination pattern 43 of the type III, a value of twenty-one pixels of (rows 3 to 9)×(columns D to F) is 1, whereas a value of a pixel P(10,D), a pixel P(10,E), and a pixel P(10,F) is 0. A value of first to fifth rows below the target pixel P(4,E) is 1, and a value of the sixth row is 0, thereby preventing dots from being extracted in three lines of the trailing edge portion of the image. With this configuration, degradation of an image having thin lines can be prevented. When a value of all of pixels in the window of 3×8 pixels matches with the determination pattern 43 of the type III, the value of the target pixel P(4,E) is converted from 1 (black) to 0 (white).

A description will be provided of the modes of suppressing the toner scattering during the fixing process. In the mode A, as illustrated in FIG. 9A, the dots in a fourth line from the trailing edge are extracted every other pixel without extracting dots in three lines from the trailing edge of the image. In the mode A, only the determination pattern 41 of the type I illustrated in FIG. 11A is used. As illustrated in FIG. 7, the line memory 1204 simultaneously inputs two pixels P(4,E) and P(4,F) to the pixel value conversion portion 1206. The pattern matching portion 1205 sets a first pixel of two pixels in the matrix of 10×10 pixels as a target pixel P(4,E), and determines whether or not eighteen pixels in a periphery of the target pixel P(4,E) match with the determination pattern 41 of the type I. When the eighteen pixels match with the determination pattern 41 of the type I, the pattern matching portion 1205 outputs the true signal 128 to the pixel value conversion portion 1206. The pixel value conversion portion 1206 converts a value of the first pixel P(4,E) from 1 (black) to 0 (white), but does not convert a value of the next pixel P(4,F). Subsequent two pixels P(4,G) and P(4,H) are simultaneously input to the pixel value conversion portion 1206, and similar pixel value conversion process is executed. In such a manner, a pixel value is converted from (black) to 0 (white) every other pixel in one line. The mode A of converting the pixels in one line uses only the determination pattern 41 of the type I.

In the mode B, as illustrated in FIG. 9B, dots in a fourth line and a fifth line from the trailing edge are extracted alternately without extracting the dots in three lines from the trailing edge of the image. In the mode B, the determination pattern 41 of the type I illustrated in FIG. 11A and the determination pattern 42 of the type II illustrated in FIG. 11B are used. When the determination pattern 41 of the type I does not match, the determination pattern 42 of the type II is used to execute pattern matching. The pattern matching portion 1205 sets a first pixel of two pixels P(4,E) and P(4,F) in the matrix of 10×10 pixels as a target pixel P(4,E). The pattern matching portion 1205 determines whether or not twenty-one pixels in the periphery of the target pixel P(4,E) match with the determination pattern 42 of the type II. When the twenty-one pixels match with the determination pattern 42 of the type II, the pixel value conversion portion 1206 does not convert a value of the first pixel P(4,E) and converts a value of the next pixel P(4,F) from 1 (black) to 0 (white). In a line below by one row, a first pixel of two pixels P(5,E) and P(5,F) is set as a target pixel P(5,E). When eighteen pixels match with the determination pattern 41 of the type I, a value of the first pixel P(5,E) is converted from 1 (black) to 0 (white), and a value of the next pixel P(5,F) is not converted. In such a manner, in the conversion of the pixel value in two lines, conversion of the value of pixels in the first line and conversion of the pixel value in the next line are alternated, thereby being capable of extracting the dots as in the mode B illustrated in FIG. 9B. That is, the mode B for converting the pixel value in two lines uses the determination pattern 41 of the type I and the determination pattern 42 of the type II.

In the mode C, as illustrated in FIG. 9C, dots in a fourth line, a fifth line, and a sixths line from the trailing edge are extracted alternately without extracting the dots in three lines from the trailing edge of the image. In the mode C, the determination pattern 41 of the type I illustrated in FIG. 11A, the determination pattern 42 of the type II illustrated in FIG. 11B, and the determination pattern 43 of the type III illustrated in FIG. 11C are used. When the determination pattern 41 of the type I and the determination pattern 42 of the type II do not match, the determination pattern 43 of the type III is used to execute pattern matching. The pattern matching portion 1205 sets a first pixel of two pixels P(4,E) and P(4,F) in the matrix of 10×10 pixels as a target pixel P(4,E). The pattern matching portion 1205 determines whether or not twenty-four pixels in the periphery of the target pixel P(4,E) match with the determination pattern 43 of the type III. When the twenty-four pixels match with the determination pattern 43 of the type III, the pixel value conversion portion 1206 converts a value of the first pixel P(4,E) from 1 (black) to 0 (white) and does not convert a value of the next pixel P(4,F). In a line below by one row, a first pixel of two pixels P(5,E) and P(5,F) is set as a target pixel P(5,E). When twenty-one pixels match with the determination pattern 42 of the type II, a value of the first pixel P(5,E) is not converted, and a value of the next pixel P(5,F) is converted from 1 (black) to 0 (white). Further in the line below by one row, a first pixel of two pixels P(6,E) and P(6,F) is set as a target pixel P(6,E). When eighteen pixels match with the determination pattern 41 of the type I, a value of the first pixel P(6,E) is converted from 1 (black) to 0 (white), and a value of the next pixel P(6,F) is not converted. In such a manner, in the conversion of the pixel value in three lines, conversion of the pixel value for each line is performed alternately, and as in the mode C illustrated in FIG. 9C, the dots can be extracted in a checkered pattern. That is, the mode C for converting the pixel value in three lines uses the determination pattern 41 of the type I, the determination pattern 42 of the type II, and the determination pattern 43 of the type III. In such a manner, a plurality of controls for suppression of the toner scattering during the fixing process can be performed.

(Register)

FIG. 8A and FIG. 8B are explanatory tables of values stored in the register 30 of the determination mode setting portion 1202. As illustrated in FIG. 10, the scanning area is divided into seven areas. The determination mode setting portion 1202 includes seven registers 31 to 37 corresponding to the seven areas, respectively. The register 30 includes a first register 31, a second register 32, a third register 33, a fourth register 34, a fifth register 35, a sixth register 36, and a seventh register 37. The registers 31 to 37 each store a mode executed in a corresponding area and a last pixel position (last dot number) in the main scanning direction in the corresponding mode, that is, the last count value 125. FIG. 8A is an explanatory table for showing types of information stored in the plurality of registers 31 to 37. The first register 31 stores a first mode and a last pixel position of the first mode. The second register 32 stores a second mode and a last pixel position of the second mode. Similarly, the third register 33, the fourth register 34, the fifth register 35, the sixth register 36, and the seventh register 37 also store respective modes and last pixel positions in the respective modes.

FIG. 8B is a table for showing one example of values stored in the plurality of registers 31 to 37. The first register 31 stores information indicating that the first mode is a mode of not performing the pixel value conversion process and information indicating that the last pixel position of the first mode is 500. The first register 31 corresponds to the first area in FIG. 10. In the first area corresponding to pixel positions of from 0 to 500 in the main scanning direction, the pixel value conversion process is not performed. The second register 32 stores information indicating that the second mode is the mode A and information indicating that the last pixel position of the second mode is 1200. The second register 32 corresponds to the second area in FIG. 10. In the second area corresponding to pixel positions of from 501 to 1200 in the main scanning direction, the mode A is executed. In the mode A, pixels are extracted in one line. In the mode A, the determination pattern 41 of the type I illustrated in FIG. 11A is used. The third register 33 stores information indicating that the third mode is the mode B and information indicating that the last pixel position of the third mode is 2000. The third register 33 corresponds to the third area in FIG. 10. In the third area corresponding to pixel positions of from 1201 to 2000 in the main scanning direction, the mode B is executed. In the mode B, pixels are extracted in two lines. In the mode B, the determination pattern 41 of the type I illustrated in FIG. 11A and the determination pattern 42 of the type II illustrated in FIG. 11B are used.

The fourth register 34 stores information indicating that the fourth mode is the mode C and information indicating that the last pixel position of the fourth mode is 4000. The fourth register 34 corresponds to the fourth area in FIG. 10. In the fourth area corresponding to pixel positions of from 2001 to 4000 in the main scanning direction, the mode C is executed. In the mode C, pixels are extracted in three lines. In the mode C, the determination pattern 41 of the type I illustrated in FIG. 11A, the determination pattern 42 of the type II illustrated in FIG. 11B, and the determination pattern 43 of the type III illustrated in FIG. 11C are used. The determination pattern 41 of the type I, the determination pattern 42 of the type II, and the determination pattern 43 of the type III are switched at a boundary of set pixel positions by a selecting device (not shown) provided in the determination pattern selecting portion 1207 so that the modes of the pixel value conversion process are changed.

The fifth register 35 stores information indicating that the fifth mode is the mode B and information indicating that the last pixel position of the fifth mode is 4800. The fifth register 35 corresponds to the fifth area in FIG. 10. In the fifth area corresponding to pixel positions of from 4001 to 4800 in the main scanning direction, the mode B is executed. The sixth register 36 stores information indicating that the sixth mode is the mode A and information indicating that the last pixel position of the sixth mode is 5500. The sixth register 36 corresponds to the sixth area in FIG. 10. In the sixth area corresponding to pixel positions of from 4801 to 5500 in the main scanning direction, the mode A is executed. The seventh register 37 stores information indicating that the seventh mode is a mode of not performing the pixel value conversion process and information indicating that the last pixel position of the seventh mode is 6000. The seventh register 37 corresponds to the seventh area in FIG. 10. In the seventh area corresponding to pixel positions of from 5501 to 6000 in the main scanning direction, the pixel value conversion process is not performed.

In the following, the mode and the last pixel position stored in each of the registers 31 to 37 are sometimes referred to as "set mode" and "register value", respectively. The first register 31 to the seventh register each store the set mode and the register value of respective areas. Therefore, the pixel value conversion process is executed in the set mode in accordance with a pixel position in the main scanning direction. The number of divided areas in the main scanning direction, the number of registers, the set modes for the divided areas, and the register values of the divided areas are not limited to the values given in the embodiment, and may be set to suitable values as appropriate.

The toner scattering caused by the change in partial light intensity in the main scanning direction is reduced by the pixel value conversion process. Further, the change in pixel width caused by variation in partial magnification in the main scanning direction is prevented. One method of normally outputting an image with use of the imaging lens 407 that does not have the fθ characteristic or that has the mild fθ characteristic is frequency modulation of modulating the frequency of the VCLK 1125 for outputting the VDO signal 122. Another method is bit data insertion/extraction of dividing one pixel into a plurality of bit data pieces with a predetermined integer value to form a bit data group and inserting (adding) or extracting (deleting) one or two or more bit data pieces to and from the bit data group. The VDO signal 122 that has been subjected to the pixel value conversion process by the pixel value conversion portion 1206 is subjected to the frequency modulation or the bit data insertion/extraction for partial magnification correction process. In the following, a description will be provided of the frequency modulation and the bit data insertion/extraction as the partial magnification correction process.

(Equalization of Pixel Width by Frequency Modulation)

As one method of setting pixel widths, which vary in accordance with main scanning positions due to the variation in partial magnification, to be substantially equal (substantially constant), a description will be provided of a method of modulating the frequency of the VCLK 1125. The crystal oscillator 111 illustrated in FIG. 4 outputs the REFCLK 1111 to the SSCG 1133. The SSCG 1133 serving as the frequency modulation portion includes the PLL. Therefore, the PLL modulates the frequency of the REFCLK 1111, and the image signal output portion 1131 generates the VCLK 1125 for outputting the VDO signal 122. When the BD signal 123 is received, the image signal output portion 1131 outputs the VDO signal 122 based on the VCLK 1125 from the SSCG 1133. When the next BD signal 123 is received, the image signal output portion 1131 outputs a reset signal 1135 to the SSCG 1133. When the reset signal 1135 is received, the SSCG 1133 outputs the VCLK 1125 having an initially set frequency to the image signal output portion 1131. Detailed description of the SSCG 1133 is omitted herein, but the SSCG 1133 is constructed so that the frequency indicated by a curved line C2 of FIG. 12D described later can be output.

Figure 12A:
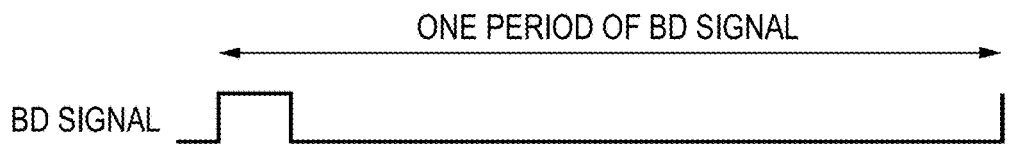
FIG. 12A, FIG. 12B, FIG. 12C, FIG. 12D, FIG. 12E, and FIG. 12F are explanatory illustrations of frequency modulation of a VCLK.
Figure 12B:
Figure 12C:
Figure 12D:
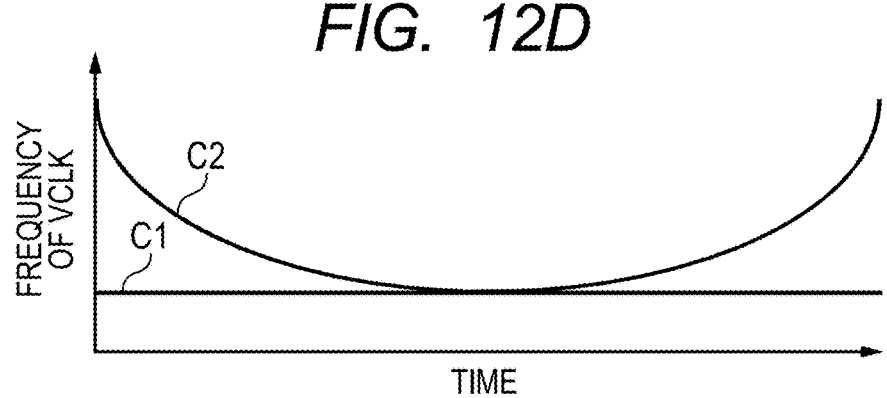

FIG. 12A, FIG. 12B, FIG. 12C, FIG. 12D, FIG. 12E, and FIG. 12F are explanatory illustrations of the frequency modulation for the VCLK 1125. FIG. 12A is an illustration of one period of the BD signal 123. FIG. 12B is an illustration of the reset signal 1135 which is output to the SSCG 1133 when the image signal output portion 1131 receives the BD signal 123. FIG. 12C is an illustration of the VDO signal 122 which is output to the laser drive portion 300 of the light scanning apparatus 400 based on the VCLK 1125 by the image signal output portion 1131 after elapse of a predetermined time period from the reception of the BD signal 123. FIG. 12D is an illustration of a curved line C1, which represents the VCLK of the constant frequency when the related-art imaging lens having the fθ characteristic is used, and a curved line C2, which represents the VCLK 1125 that has been subjected to the frequency modulation when the imaging lens 407 that does not have the fθ characteristic or that has the mild fθ characteristic is used. The frequency of the VCLK in the case in which the related-art imaging lens having the fθ characteristic is used is always maintained constant (curved line C1). In contrast, when the imaging lens 407 that does not have the fθ characteristic or that has the mild fθ characteristic is used, after the BD signal 123 is received, the SSCG 1133 gradually reduces the frequency of the VCLK 1125, sets the frequency to be minimum around the center of the sheet, and thereafter gradually increases the frequency (curved line C2).

Figure 12E:
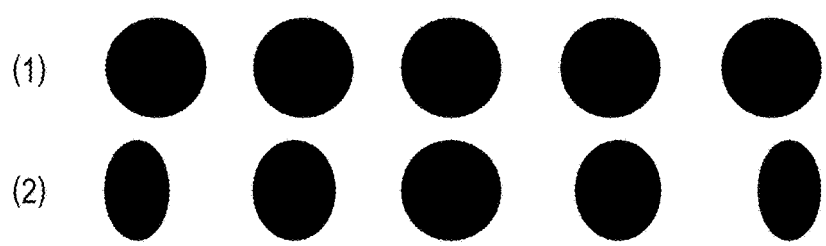
Figure 12F:
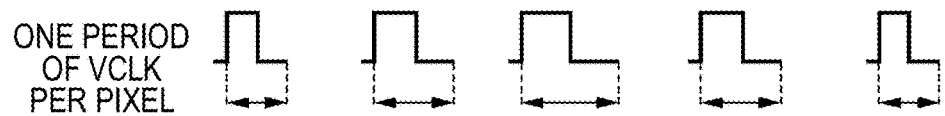

FIG. 12E is a schematic illustration of an output time per pixel (per dot). FIG. 12E(1) is a schematic illustration of the output time per pixel which is always maintained constant irrespective of a position in the main scanning direction when the related-art imaging lens having the fθ characteristic is used. In the case of the imaging lens having the fθ characteristic, the rotation angle of the rotary polygon mirror 404 per unit time and the movement distance of the light spot scanning on the surface of the photosensitive drum 500 per unit time have a proportional relationship, and hence the output time per pixel is maintained constant. With this, the widths of the pixels formed on the photosensitive drum 500 can be equalized. FIG. 12E(2) is a schematic illustration of an output time per pixel which is changed in accordance with the frequency of the VCLK 1125 when the imaging lens 407 that does not have the fθ characteristic or that has the mild fθ characteristic is used. In the case of the imaging lens 407 that does not have the fθ characteristic or that has the mild fθ characteristic, the moving speed of the light spot which scans the surface of the photosensitive drum 500 changes in accordance with the position in the main scanning direction. Therefore, the output time per pixel is changed in accordance with the position in the main scanning direction. With this, the widths of the pixels formed on the photosensitive drum 500 can be equalized. FIG. 12F is an illustration of one period of the VCLK 1125 corresponding to the output time per pixel illustrated in FIG. 12E(2). The VCLK 1125 is subjected to the frequency modulation in accordance with the position in the main scanning direction.

Figure 13A:
FIG. 13A, FIG. 13B, FIG. 13C, and FIG. 13D are illustrations of a transition of the frequency modulation of the VCLK for several lines.
Figure 13B:
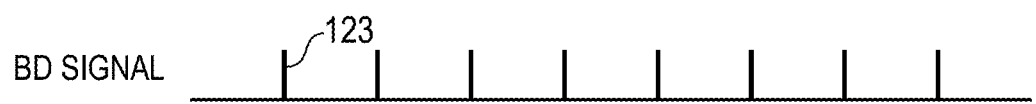
Figure 13C:
Figure 13D:
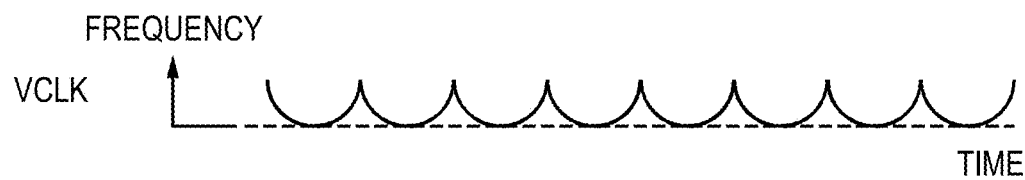

FIG. 13A, FIG. 13B, FIG. 13C, and FIG. 13D are illustrations of a transition of the frequency modulation of the VCLK 1125 for several lines. FIG. 13A is an illustration of a TOP signal 124 serving as a synchronization signal in a sub-scanning direction, which is used for printing of a top (first line) of the image to an appropriate position of the recording medium. When the TOP signal 124 is received, the image signal output portion 1131 starts printing. FIG. 13B is an illustration of the BD signal 123 output for each line. FIG. 13C is an illustration of the VDO signal 122 which is output based on the BD signal 123. When the image signal output portion 1131 receives the TOP signal 124 and starts printing, the image signal output portion 1131 outputs the VDO signal 122 to the laser drive portion 300 of the light scanning apparatus 400 based on the BD signal 123. FIG. 13D is an illustration of the frequency of the VCLK 1125. The frequency of the VCLK 1125 which is used for outputting the VDO signal 122 is modulated for each BD signal 123 so that the frequency is modulated for each line. As described above, the modulation of the VCLK 1125 for each BD signal 123 equalizes the pixel widths in the main scanning direction, to thereby correct the partial magnification.

(Equalization of Pixel Widths by Bit Data Insertion/Extraction)

Next, as another method of setting the pixel widths, which vary in accordance with the main scanning positions due to the variation in partial magnification, to be substantially equal (substantially constant), a description will be provided of the bit data insertion/extraction. The bit data insertion/extraction is performed with digital pulse width modulation (PWM) instead of modulation of the frequency of the VCLK 1125. The bit data insertion/extraction is a method of converting the VDO signal 122 per pixel into a pulse width modulation signal (PWM signal) of a bit data group including a plurality of bit data pieces, and inserting (adding) or extracting (deleting) one or two or more bit data pieces to or from the bit data group. The PLL of the SSCG 1133 generates bit data insertion/extraction clocks of integer multiples of the VCLK 1125. One pixel is divided by a predetermined integer value. One pixel includes bit data pieces, and the number of bit data pieces is a predetermined integer value. The bit data insertion/extraction clocks have a frequency of multiples of a predetermined integer value of the VCLK 1125. For example, when one pixel is divided into thirty two bit data pieces, the bit data insertion/extraction clocks have a frequency of thirty two times the VCLK 1125. The predetermined integer value is not limited to 32, and may be any suitable integer value such as 8, 16, or 64.

The division number of one pixel is N. The number of bit data pieces (hereinafter referred to as "bit data number") inserted (added) to or extracted (deleted) from the bit data group is D. The magnification is M. The following relational expression is satisfied.

$$M \approx (N+D)/N$$

For example, consideration is made on the case in which the division number N of one pixel is 32, and the magnification M varies within the range of from 1.0 to 1.3. The magnification M varies in accordance with the main scanning positions. The scanning area is divided into a plurality of areas. The magnification M is set for each of the plurality of areas. In an area in which the magnification M is 1.3, the bit data number D is set to 10 based on the expression of $D \approx (M-1) \times N = (1.3-1) \times 32 = 9.6$. Ten bit data pieces are inserted to the bit data group. In an area in which the magnification M is 1.2, similarly, the bit data number D is set to 6 based on the expression of $D \approx 6.4$. Six bit data pieces are inserted to the bit data group. In an area in which the magnification M is 1.1, the bit data number D is set to 3 based on the expression of $D \approx 3.2$. Three bit data pieces are inserted to the bit data group. In an area in which the magnification M is 1.0, the bit data number D is 0. Thus, in the area in which the magnification M is 1.0, the bit data insertion/extraction is not performed. In such a manner, the pixel widths in the main scanning direction are equalized, thereby correcting the partial magnification.

(Generation of VDO Signal)

Figure 14:
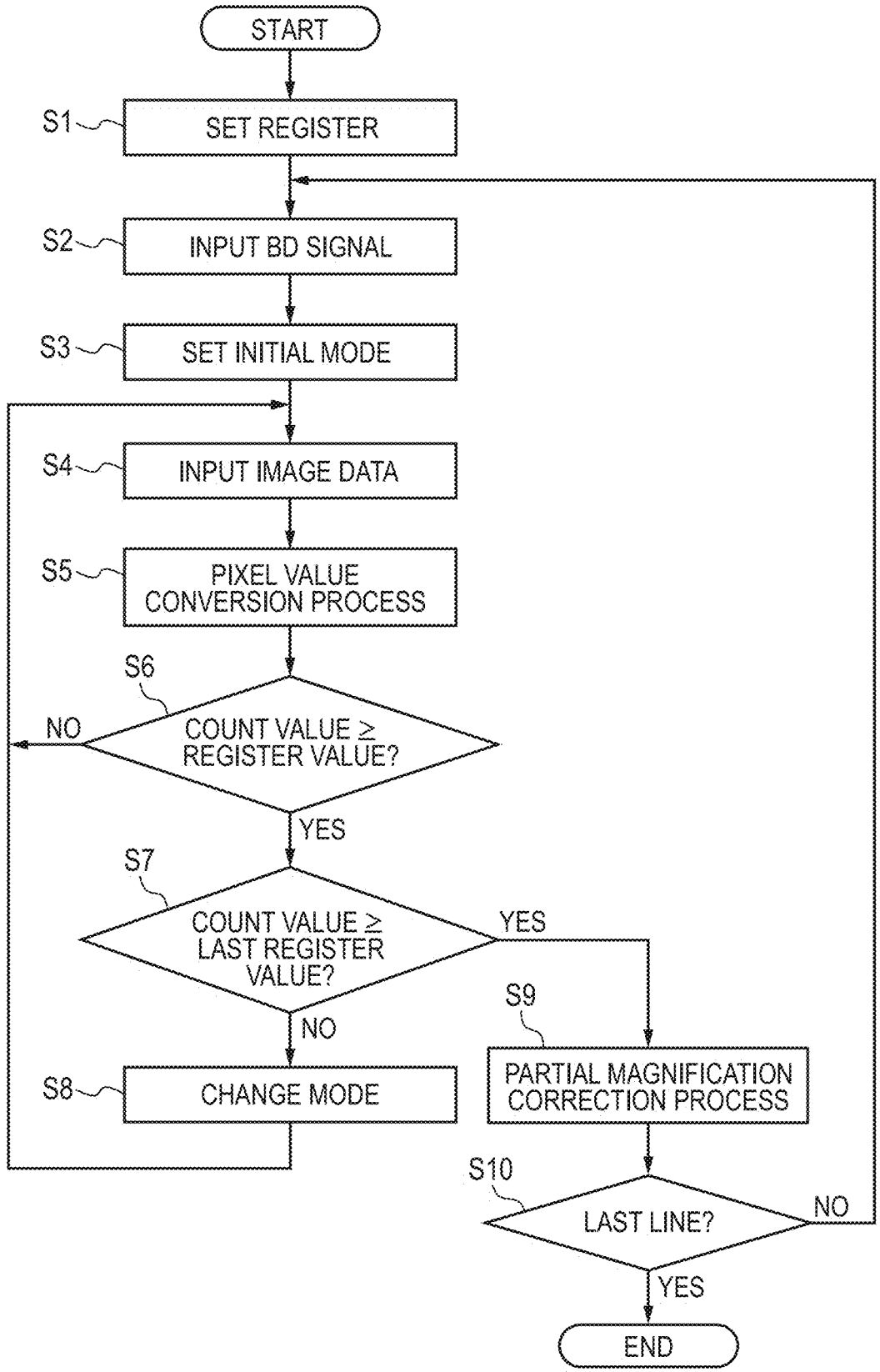
FIG. 14 is a flow chart for illustrating a control operation for generation of a VDO signal.

FIG. 14 is a flow chart for illustrating the control operation for generation of the VDO signal. The CPU 1101 executes the control operation for generation of the VDO signal based on a program stored in the flash ROM 104. The control operation for generation of the VDO signal is executed during the image forming operation. When the control operation for generation of the VDO signal is started, the CPU 1101 writes the modes and the last pixel positions in the register 30 of the determination mode setting portion 1202 as illustrated in FIG. 8B to set the register 30 (Step S1). When the BD signal 123 is input to the image signal output portion 1131 (Step S2), the CPU 1101 sets, to the determination mode setting portion 1202, the first mode of the first register 31 as an initial mode for suppression of the toner scattering during the fixing process (Step S3). When 32-bit image data is input from the SDRAM 105 to the image signal output portion 1131 by the direct memory access (Step S4), the counter 1201 counts the spread spectrum clock 1134 and outputs the count value 125. The spread spectrum clock 1134 is a reference clock for outputting the image data in pixel unit, and hence the count value 125 is a value indicating the pixel position in the main scanning direction. The CPU 1101 causes the image signal output portion 1131 to execute the pixel value conversion process in the first mode (Step S5). In the embodiment, the first mode is a mode of not performing the pixel value conversion process, and hence the pixel value conversion process is not executed.

The CPU 1101 causes the determination mode setting portion 1202 to determine whether or not the count value 125 has reached a register value of the first register (Step S6). When the count value 125 has not reached the register value (NO in Step S6), the process returns to Step S4. When the count value 125 has reached the register value (YES in Step S6), the CPU 1101 causes the determination mode setting portion 1202 to determine whether or not the count value 125 has reached a last register value in the main scanning direction (Step S7). In the embodiment, the last register value is a register value of the seventh mode (6000). When the count value 125 has not reached the last register value (NO in Step S7), the determination mode setting portion 1202 changes the set mode from the first mode to the second mode (Step S8). The process returns to Step S4. The CPU 1101 causes the image signal output portion 1131 to execute the pixel value conversion process in the second mode (Step S5). In the embodiment, the pixel value conversion process is executed up to the seventh mode.

Meanwhile, when the count value 125 has reached the last register value (YES in Step S7), the CPU 1101 further executes the partial magnification correction process to the VDO signal that has been subjected to the pixel value conversion process (Step S9). The partial magnification correction process is the frequency modulation for the VCLK 1125 or the bit data insertion/extraction, which are described above. The CPU 1101 determines whether or not the partial magnification correction process for the last line has been terminated (Step S10). When the partial magnification correction process for the last line has not been terminated (NO in Step S10), the process returns to Step S2. When the BD signal is input to the image signal output portion 1131 (Step S2), the CPU 1101 causes the image signal output portion 1131 to execute the pixel value conversion process and the partial magnification correction process for the next line. When the partial magnification correction process for the last line has been terminated (YES in Step S10), the CPU 1101 terminates the control operation for generation of the VDO signal.

According to the embodiment, in an inexpensive image forming apparatus which performs scanning with the light beam with use of the imaging lens that does not have the fθ characteristic or that has the mild fθ characteristic, the toner scattering during the fixing process can be suppressed without impairing the reproducibility of thin lines. Further, according to the embodiment, the toner scattering in a line image can be suppressed.

The image forming apparatus 100 according to the embodiment forms a monochromatic image. However, the present invention is applicable also to an image forming apparatus that forms a color image.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, the toner scattering in the line image can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-252973, filed Dec. 27, 2016 which is hereby incorporated by reference herein in its entirety.

What is claimed is:

1. An image forming apparatus, comprising:
an image signal generating portion configured to generate an image signal based on image data to output the image signal in accordance with a video clock;
a light source configured to emit a light beam based on the image signal;
a deflection device configured to deflect the light beam so that the light beam emitted from the light source scans a surface of a photosensitive member in a main scanning direction; and
a lens configured to image the light beam deflected by the deflection device as a light spot onto the surface of the photosensitive member,
wherein the image signal generating portion comprises:
a mode setting portion configured to set a plurality of modes including a mode in which a value of a pixel of the image data is not converted and a mode in which one or more lines in which the value of the pixel of the image data is to be converted are set, to a plurality of areas into which a scanning area on which an image is to be formed is divided in the main scanning direction, respectively; and
a pixel value conversion portion configured to convert the value of the pixel of the image data in each of the plurality of modes in accordance with a position of the pixel in the main scanning direction of the image data, and
wherein the image signal generating portion is configured to:
divide the image data, of which the value of the pixel has been converted by the pixel value conversion portion, by a predetermined integer value for each pixel to obtain a bit data group including a plurality of bit data for each pixel; and
set a number of bit data to be added to or to be deleted from the bit data group in accordance with the position of the pixel in the main scanning direction.

2. An image forming apparatus according to claim 1, wherein the mode setting portion is configured to set a number of the plurality of areas by which the scanning area is divided.

3. An image forming apparatus according to claim 1, wherein the mode setting portion is configured to set a length of each of the plurality of areas in the main scanning direction.

4. An image forming apparatus according to claim 1, wherein the mode setting portion is configured to set the plurality of modes so that the value of the pixel of the image data in a predetermined number of lines from a trailing edge of the image is not converted.

5. An image forming apparatus according to claim 1, wherein the image signal generating portion further comprises a frequency modulation portion configured to modulate a frequency of the video clock in accordance with the position of the pixel in the main scanning direction, and
wherein the image signal generating portion is configured to output the image signal, which is generated based on the image data of which the value of the pixel is converted by the pixel value conversion portion, in accordance with the video clock that has been modulated by the frequency modulation portion.

6. An image forming apparatus according to claim 1, wherein a movement distance of the light spot imaged by the lens in the main scanning direction is unproportional to a deflection angle of the deflection device configured to deflect the light beam.

7. An image forming method, comprising:
setting a plurality of modes including a mode in which a value of a pixel of the image data is not converted and a mode in which one or more lines in which the value of the pixel of the image data is to be converted are set, to a plurality of areas into a scanning area on which an image is to be formed is divided in a main scanning direction, respectively;

wherein the setting comprises setting the plurality of modes so that the value of the pixel of the image data in a predetermined number of lines from a trailing edge of the image is not converted;

converting a value of a pixel of the image data in each of the plurality of modes in accordance with a position of the pixel in the main scanning direction of the image data;

generating an image signal based on the image data of which the value of the pixel is converted;

emitting a light beam from a light source based on the image signal; and deflecting the light beam to image the light beam as a light spot on a surface of a photosensitive member.

8. An image forming method according to claim 7, further comprising setting a number of the plurality of areas by which the scanning area is divided.

9. An image forming method according to claim 7, further comprising setting a length of each of the plurality of areas in the main scanning direction.

10. An image forming method according to claim 7, further comprising modulating a frequency of a video clock for outputting the image signal to the light source in accordance with the position of the pixel in the main scanning direction.

11. An image forming method according to claim 7, further comprising:

dividing the image data, of which the value of the pixel has been converted, by a predetermined integer value for each pixel to obtain a bit data group including a plurality of bit data for each pixel; and setting a number of bit data to be added to or to be deleted from the bit data group in accordance with the position of the pixel in the main scanning direction.

12. An image forming method according to claim 7, wherein a movement distance of the light spot in the main scanning direction is unproportional to a deflection angle of the light beam.

* * * * *